US008211484B2

(12) United States Patent
Thorsoe et al.

(10) Patent No.: US 8,211,484 B2
(45) Date of Patent: Jul. 3, 2012

(54) PROCESS FOR PREPARING A FOOD PRODUCT USING DEPOLYMERISED PECTIN AS STABILISER

(75) Inventors: Hanne Thorsoe, Skanderborg (DK); Hans Christian Buchholt, Brabrand (DK)

(73) Assignee: Dupont Nutrition Biosciences APS, Copenhagen K (DK)

( * ) Notice: Subject to any disclaimer, the term of this patent is extended or adjusted under 35 U.S.C. 154(b) by 612 days.

(21) Appl. No.: 10/568,498

(22) PCT Filed: Aug. 19, 2004

(86) PCT No.: PCT/IB2004/002795
§ 371 (c)(1),
(2), (4) Date: Feb. 16, 2006

(87) PCT Pub. No.: WO2005/016027
PCT Pub. Date: Feb. 24, 2005

(65) Prior Publication Data
US 2006/0210668 A1  Sep. 21, 2006

(30) Foreign Application Priority Data
Aug. 19, 2003 (GB) .................................. 0319503.9

(51) Int. Cl.
*A23C 9/12* (2006.01)
(52) U.S. Cl. ........................................................ 426/42
(58) Field of Classification Search .................... 426/42
See application file for complete search history.

(56) References Cited

U.S. PATENT DOCUMENTS

| | | | | |
|---|---|---|---|---|
| 4,391,830 A * | 7/1983 | Gudnason et al. | ............. | 426/43 |
| 4,672,034 A | 6/1987 | Rombouts et al. | | |
| 5,498,702 A | 3/1996 | Mitchell et al. | | |
| 5,607,714 A | 3/1997 | Connolly | | |
| 5,690,975 A | 11/1997 | Akahoshi et al. | | |
| 5,900,268 A | 5/1999 | Mazoyer et al. | | |
| 6,143,337 A | 11/2000 | Fishman et al. | | |

FOREIGN PATENT DOCUMENTS

| | | |
|---|---|---|
| CH | 617 324 A5 | 5/1980 |
| DE | 648 225 | 7/1937 |
| DE | 662 664 | 7/1938 |
| DE | 2 129 853 | 12/1972 |
| DE | 27 59 032 | 7/1979 |
| DE | 43 13 549 C1 | 10/1994 |
| EP | 0 552 728 | 7/1993 |
| EP | 0 426 434 B1 | 12/1996 |
| EP | 0 868 854 | 10/1998 |
| EP | 0 958 746 A1 | 11/1999 |
| EP | 0 709 033 B1 | 1/2000 |
| EP | 1 206 909 | 5/2002 |
| EP | 1 270 729 | 1/2003 |
| EP | 0 958 746 B1 | 3/2003 |
| FR | 888.663 | 12/1943 |
| FR | 2 745 980 | 9/1997 |
| FR | 2 789 267 | 2/1999 |
| GB | 2 311 024 A | 9/1997 |
| GB | 2 314 564 | 1/1998 |
| JP | 3285640 | 3/2002 |
| WO | WO 97/03574 | 2/1997 |
| WO | 98/19349 | 5/1998 |
| WO | 02/42484 | 5/2002 |

OTHER PUBLICATIONS

Tamime, A. Y. et al. 1985. Yoghurt: Science and Technology. Pergamon Press. New York. Pages: 18, 25-26, 60, 103-104, 111, 145-146, 235-238, 241-243, 255-256.*
International Search Report for PCT/IB2004/002795 dated Dec. 14, 2004.
Michel et al, Journal of Food Science, vol. 50 (1985) 1499-1502.
C. D. May in Thickening and Gelling Agents for Food, Editor: A Imeson, Ch. 6, pp. 124-152, Blackie Academic & Professional, 1992, Pectins.
"Carbohydrates", Kirk-Othmer Encyclopedia of Chemical Technology, vol. 4, pp. 911-948, 1992, John Wiley & Sons.
JP Publication No. 2000-273101 "Pectin and its preparation and acidic protein food using same on its preparation".
JP Publication No. 10-313781 Manufacture of acidic milk drink (English translation).
JP Publication No. 07-264977 (Application No. 06-062213) Composition for stabilizing acidic milk beverage and acidic milk beverage (English translation).
JP 3285640 "Production of liquid fermented milk and lactic acid bacterial . . . hydrolyzate" (English translation).
JP Publication No. 03-201943 "Preparation of Acidic Dairy Food" (English translation).
Glahn et al, in Gums and Stabilisers for the food Industry 8, pp. 393-402, Editors: G.O. Phillips, P. A. Williams & D. J. Wedlock, IRL Press, 1995.
Glahn et al, Food Ingredients Europe, Conference Proceedings, pp. 252-256, 1994, Process Press, Europe, Marsden, Casein-pectin interaction in sour milk beverages.
Fruit Preparations for Yoghurts, Food Technology Europe, Jun./Jul. 1995 130-137.
Pippen et al, JACS, 1950, 72, 813-816.
Deckers et al, Carbohydrate Polymers 6 (1986) 361-378.
Danisco Ingredients, Technical Memorandum: Application of Functional Systems in Yogurt and Other Fermented Products, TM 2025-2e.
Bogh-Sorensen et al, Konserverings Teknik 2, DSR Forlag, Kobenhausen 1986.
Macfadyen et al."New Uses of Pectin in the Dairy Industry" Int. Food Ing. 1992, vol. ½, 11-14.

(Continued)

*Primary Examiner* — D. Lawrence Tarazano
*Assistant Examiner* — Hamid R Badr
(74) *Attorney, Agent, or Firm* — Nixon & Vanderhye P.C.

(57) ABSTRACT

The present invention provides a process for the production of a food product comprising the steps of (i) contacting a food material with a stabilizer to provide a food intermediate; and (ii) fermenting the food intermediate; wherein the stabilizer comprises a depolymerized pectin and wherein the food material comprises a protein.

30 Claims, No Drawings

OTHER PUBLICATIONS

Maroziene et al. "Interaction of pectin and casein micelles" Food Hydrocolloids 14 (2000) 391-394.

Yamaguchi et al, Biosci. Biotech. Biochem., 58(4), 1994, 679-682.

van Hooydonk et al, Voedingsmiddelentechnologie, Aug 19 (1982) jaarjang 15 (nr 17) 23-25.

Van Hooydonk et al, The preparation of drinkyogurt 2 The influence of the product composition (English translation).

Thibault et al, Sugar Processing Research Conference, 23-39, 1990, Structure and properties of sugarbeet pectins.

Thibault et al, Proceedings of Eurofood Chem V, 416, 420, 1989.

Thibault et al, The Chemistry and Technology of Pectin, Ch. 7, pp. 119-133, Academic Press, Inc., 1991, Gelation of sugar beet pectin by oxidative coupling.

Rombouts et al, in Chemistry and Function of Pectins, Ch. 5, pp. 49-60, Editors: M.L. Fishman and J. J. Jen, ACS Symposium Series, American Chemical Society, 1986.

Rombouts et al, Carbohydrate Research, 154 (1986) 177-187.

Renard et al, Carbohydrate Research, 244 (1993) 99-114.

Kratz et al, DMZ, 1995, vol. 116/14, 640-651.

Nussinovitch, Hydrocolloid Applications: Gum Technology in the Food and Other Industries, Ch. 5, pp. 83-104, Blackie Academic & Professional, Nov. 1997.

Neuenburg, Die Industrielle Obst-und Gemuseverwertung, 67, Jahrgang (1982), 247-252.

Microbial Ecology of Different Types of Food, Ch. 26, pp. 703-718, Part II in The Microbiological Safety and Quality of Food, vol. I/vol. II, Editors: B. M. Lund, T.C. Baird-Parker, G.W. Gould, Aspen Publishers, Inc., Gaithersburg, Maryland, 2000.

* cited by examiner

PROCESS FOR PREPARING A FOOD PRODUCT USING DEPOLYMERISED PECTIN AS STABILISER

This application is the U.S. national phase of international application PCT/IB2004/002795 filed 19 Aug. 2004, which designated the U.S., and claims priority to GB 0319503.9 filed 19 Aug. 2003, the entire content of each of which is hereby incorporated by reference.

The present invention relates to a process for the production of a food product and to a food product produced by the process.

BACKGROUND ART

Certain protein-containing food products, such as acidified dairy products like drinking yoghurt and stirred yoghurt, require a stabiliser to stabilise the protein system against aggregation, sedimentation and separation. The major protein present in cows' milk is casein, which constitutes about 80% of the total protein content. The remaining protein in cows' milk is termed "whey protein" and consists predominantly of beta-lactoglobulin and alpha-lactalbumin. Cows' milk is comprised of water and milk solids. The milk solids include fat and milk solid non-fat (MSNF) which is made up of protein together with lactose and various minerals.

Pectin has traditionally been used as a stabiliser in protein-containing food products such as acidified protein beverages (typically high ester pectin) and stirred yoghurt (typically low ester pectin). Pectin is a structural polysaccharide found in green land plants, for example, fruit and vegetables and may be extracted from citrus fruit peel. At a molecular level, pectin consists of a linear chain of galacturonic acid units linked through $\alpha$-1,4 glycosidic bonds (the 'smooth region'). This regular structure is interrupted by rhamnopyranosyl residues with side chains of neutral sugars (the 'hairy region'). Pectin molecules have a molecular weight of up to about 200,000 and a degree of polymerisation of up to about 800 units. A proportion of the carboxylic acid groups of the galacturonic acid units are methyl esterified. The properties of pectin depend on the degree of esterification, which is less than 50% for low-ester (LE) pectin and more than 50% for high-ester (HE) pectin.

Pectin is known to have the ability either to prevent aggregation of casein micelles or to be the cause of it, depending on the pH of the system. The micellar casein-pectin system switches from hydrocolloid non-adsorption and depletion flocculation at neutral pH 6.7 to hydrocolloid adsorption and polymeric stabilisation at pH 4 [2, 4]. Therefore, although pectin is an effective stabiliser at acidic pH, at neutral pH conditons it is incompatible with the milk proteins and separates the milk into two phases.

Depletion flocculation of casein micelles involves exclusion of the polymer pectin chains from the space between the colloidal casein micelles, which induces an attractive interaction between the casein micelles. If the depletion attraction is strong enough, segregative phase separation occurs resulting in two immiscible aqueous phases, where the upper phase is rich in pectin and poor in casein micelles, while the lower phase is, on the contrary, mainly loaded with casein micelles [1, 2, 4]. At a low pectin concentration, the phase volume occupied by the pectin molecules is low. At increasing pectin concentrations, the occupied volume and the osmotic pressure of the pectin solution increase, which induces a stronger flocculation of the casein micelles. Finally, at a certain pectin concentration, the phase separation takes place. About 0.20% HE pectin is needed to induce phase separation in skimmed milk at pH 6.7 [2].

Pectin is a non-adsorbing polymer when it is in solution with skimmed milk at pH 6.7, but when lowering the pH to 5.3, the pectin molecule adsorbs onto the casein micelle. If the pectin concentration is low and insufficient for full coverage of the casein micelles, bridging flocculation occurs. When increasing the pectin concentration further, the casein micelles become fully coated and the system re-stabilises. Thereby, the attraction between the casein particles is lowered and stable conditions are obtained [2]. Although the adsorption of pectin onto the casein micelles is possible at pH conditions above the isoelectric point of caseins (pI~4.6), the pH of efficient stabilisation is generally restricted to about pH 3.5 to 4.4 where the pectin and casein carry sufficient opposite net charges for effective adsorption [4].

This mechanism is used to stabilise acidic protein beverages against protein aggregation. Efficient polymeric stabilisation is achieved by the combination of high molecular weight, high surface coverage and a blockwise distribution of galacturonic acid groups. Therefore in theory, the best polymeric stabiliser would be a copolymer with a strongly adsorbing terminal with low solvent affinity and a voluminous dangling end with high solvent affinity to increase repulsion upon forced polymer overlap [4]. For stabilisation of acidic protein beverages, HE pectin has generally been considered to be the hydrocolloid of choice. Although HE pectin has a lower charge density than low-ester (LE) pectin and thereby a weaker electrostatic interaction with casein micelles, it generally serves as a more effective stabiliser of casein dispersions. It is believed that a smaller region of the HE pectin molecule interacts with the casein particle, allowing a more substantial part of the pectin dangling chain to be freed from solvent interaction thus preventing protein aggregation through steric hindrance [7].

The difference in the stabilisation characteristics of HE pectin at different pH values determines the applications in which HE pectin may be used as a stabiliser and the stage in the production process when the HE pectin may be added.

The acidification of protein beverages can be achieved by the addition of an acid (for example an acidic fruit juice). Acidification can also be achieved via fermentation. However, for acidified protein beverages containing HE pectin, these two processes are technically distinct from each other:

For directly acidified protein beverages like milk juice drinks, addition of juice and/or acid directly to milk results in the formation of acid casein particles of uncontrollable size. These particles are typically too big to be kept in suspension resulting in a non-stable acidic protein beverage with a sandy mouth-feel upon heat treatment. In the production of directly acidified protein beverages, the destabilising effect of high molecular weight HE pectin at neutral pH is used to advantage. The HE pectin is typically added to the milk before acidification and, under the neutral pH conditons, induces separation of the milk into two phases. The osmotic effect of pectin concentrates the intact casein micelles in a lower, protein rich phase and leaves the pectin-rich whey phase virtually free of micelles. The casein phase has the properties of a liquid and can be dispersed into the whey phase in the form of droplets by stirring. The more shear applied to the system, the smaller the drops become and the more like an oil-in-water emulsion the system becomes. The subsequent rapid pH drop through direct acidification freezes the casein droplets in their native form at the size they had in the neutral milk and thereby creates acid casein particles of controlled size [5]. During the acidification process natural stabilisation of casein is destroyed and the presence of HE pectin that forms the above-mentioned protective coat around the casein micelles prevents aggregation and precipitation [13].

Thus, for directly acidified protein beverages, HE pectin is added at neutral pH and induces phase separation. Strong mechanical stirring is then used to keep the precipitated casein proteins in suspension. The system is rapidly acidified freezing the casein proteins in suspension. The casein proteins are stabilised by the high-ester pectin molecules under the acidic conditions and are thereby prevented from sedimentation in the final application.

For fermented milk products, HE pectin cannot be used in the same way. Production of fermented milk products typically involves the steps of pasteurisation of the milk base, followed by inoculation with bacteria and finally fermentation. During fermentation by bacteria, the pH of the milk is reduced gradually and slowly in contrast to the rapid pH drop in the above application. Thereby, a disintegration of the casein micelles takes place that thickens or gels the milk into yoghurt [5, 13].

Addition of traditional, high molecular weight HE pectin to the milk before fermentation would induce phase separation as described above, when applied in concentrations required for efficient protein stabilisation of the final fermented drink. Phase separation in this application would be undesirable because the characteristic yoghurt structure and its subsequent texture impact would be lost. Furthermore the precipitated casein micelles cannot be kept in suspension by stirring in this application. Mechanical stress and incorporation of oxygen is normally avoided during fermentation of milk to give the live bacteria the best fermentation conditions. Therefore, strong mechanical stirring to keep the separated casein micelles in suspension cannot be applied. Moreover, the pH drops too slowly to freeze the casein structures. In summary, high molecular weight HE pectin is not typically effective if added to milk before fermentation and is instead added after fermentation to protect the acidified proteins against aggregation [14].

For fermented milk products like stirred yoghurt the typical choice of pectin stabiliser is LE pectin that provides both stability and texture to the fermented protein system. In neutral milk the phase separation boundary is obtained at even lower pectin concentrations when LE pectin is applied [16]. In practice about 0.15% LE pectin can be added to neutral milk without phase separation. However, this low dosage is often not sufficient to obtain a required high viscosity and creaminess in the resulting fermented milk product like stirred yoghurt. Moreover, the request for improved viscosity and creaminess becomes even more relevant when the solid milk ingredients like proteins and fat are reduced in the formulation for the purposes of cost reduction or calorie reduction.

For fermented dairy products which contain live culture the final product is not typically pasteurised or sterilised. It is therefore of utmost importance to pasteurise the milk prior to fermentation, to avoid contamination during fermentation and contamination of the final product. When pectin is applied to fermented milk drinks containing live culture, it must be sterilised as well to avoid contamination of the product. As discussed above, known commercial pectin products cannot be added to the milk prior to pasteurisation, inoculation and fermentation and therefore the pectin needs to be sterilised separately. This typically involves the heat sterilisation of aqueous pectin solutions that require additional processing and equipment to both dissolve and heat the pectin. The pectin is typically in the form of a pectin syrup which is sterilised by heating and subsequently added to the already fermented milk base. The additional pectin sterilisation process requires additional tank capacity and heat equipment and increases the energy costs. The alternative and much simpler method of adding pectin directly to the fermented milk in the form of a dry mix with sugar is not applicable due to the contamination risk.

For manufacturers of fermented milk products it would be easier and cheaper (e.g. in terms of process equipment and energy requirement) to operate with a stabiliser which can be added to the milk prior to fermentation i.e. before the slow acidification. Before fermentation, it is common to pasteurise the milk in order to avoid contamination but also, which is of significant importance, to heat denature the whey proteins to get optimal yoghurt structure. This process would be greatly simplified if the pasteurisation of milk could be combined with the pasteurisation of the stabiliser. The stabiliser would then not have to be sterilised separately. Additionally, the method of addition of the stabiliser would be more flexible, since both direct addition as dry mix with sugar and dispersion in a saturated sugar solution could be used as alternatives to the dissolved stabiliser solution.

It is desirable to seek a stabiliser of fermented protein food products that is compatible with proteins in the food material such as milk and which can be added to the food material, resist a pasteurisation together with the food material, prevent flocculation and phase separation during fermentation and finally stabilise the acidified proteins after fermentation and optionally after a final pasteurisation to prolong the shelf-life.

One of the difficulties in providing a stabiliser that may be added prior to pasteurisation, inoculation and fermentation is incompatibility of the stabiliser with the proteins (e.g. milk proteins) at neutral pH. Generally, proteins (e.g. milk proteins) and polysaccharides (e.g. pectin) are incompatible at a sufficiently high bulk concentration and under conditions inhibiting formation of inter-biopolymer complexes. This mainly occurs at a sufficiently high ionic strength (exceeding 0.2), pH values above the protein isoelectric point and at a total biopolymer concentration above 3-4% [1, 12, 16], whereas alkaline pH conditions and low ionic strengths enhance the co-solubility [1, 4]. Furthermore, protein-polysaccharide incompatibility usually increases on heating and with protein denaturation [6, 9, 12, 15]. Therefore, the important pasteurisation of milk, in order to denature the whey proteins before fermentation, would be likely to enhance incompatibility even further in a blend of casein micelles and pectin at neutral pH conditions. The conditions for a limited compatibility are different for systems including neutral (e.g. locust bean gum and guar gum), sulphated (e.g. carrageenan) or carboxylated (e.g. pectin) polysaccharides and the compatibility typically decreases in the order sulphated>neutral>carboxylated polysaccharides [6, 7, 12]. The effect of several hydrocolloids on the stabilisation of casein micelles has been tested with locust bean gum and guar gum of the neutral polysaccharides; gum arabic, CMC (carboxymethylcellulose), pectin, hyaluronic acid and alginates of the carboxylated polysaccharides; and agarose, heparin, chondroitin sulphates, cellulose sulphate, fucoidan and carrageenan of the sulphated polysaccharides. Only carrageenan induced significant stabilisation at pH 6.8 [11].

High molecular weight and rigidity of macromolecule chains tend to increase incompatibility and normally, linear polysaccharides are more incompatible with proteins than branched polysaccharides. In general, the larger the difference in molecular weight and in hydrophilicity, the more pronounced the incompatibility of the biopolymers [12]. The following examples are found in literature:

A system of HE pectin and skimmed milk at natural pH clearly demonstrates depletion flocculation [1, 4, 8]. The destabilisation and subsequent phase separation is even known as a tool to efficiently concentrate proteins from skimmed milk on a technological scale [10]. Depletion flocculation of casein micelles at neutral pH occurs whatever the type of pectin used (low-ester, low-ester amidated and high-ester pectin). The phase separation boundary is obtained at lower polysaccharide concentrations with LE pectin than for HE pectin [16].

Mixing guar gum (neutral polysaccharide) with skimmed milk at neutral pH leads to phase separation, but the phase boundary shifts to higher guar concentrations, when the molecular weight of guar gum is reduced through degradation [17]. Locust bean gum, guar gum and hydrolysed guar gum with reduced molecular weight (all neutral polysaccharides) behave differently in a micellar casein system at neutral pH. Since locust bean gum and hydrolysed guar gum have a lower intrinsic viscosity than the initial guar gum sample, they occupy a smaller volume in the medium per molecule than the guar gum chains. The exclusion of the polymer thus occurs to a lesser extent, resulting in a decreased aggregation of casein micelles at the same polysaccharide concentration [18].

At pH 7, CMC readily precipitates casein from both skimmed milk and from casein model solutions. Less CMC is required when higher viscosity types are used, i.e. types with higher molecular weight [4].

At present, the only well-known and readily available commercial product on the market for fermented protein beverage applications which can be added prior to fermentation is soluble soybean polysaccharide (SSPS), produced by Fuji Oil [19]. SSPS is a water-soluble polysaccharide extracted and refined from soybean. Fuji Oil Co., Ltd., Japan, has marketed SSPS under the brand name SOYAFIBE-S since 1993. SSPS is mainly composed of the dietary fibre of soybean and has relatively low viscosity and high stability in aqueous solution.

SSPS is a much more branched polymer than HE pectin with a rather short backbone and many more long side chains. HE pectin has a long backbone and just a few short side chains. The component sugars in SSPS are mainly galactose, arabinose, galacturonic acid but also include many others such as rhamnose, fucose, xylose and glucose. Gel filtration chromatographic analysis by HPLC shows that SSPS consist roughly of three components having approximate molecular weights of 550,000; 25,000 and 5,000. The major component of SSPS consists of long-chain rhamnogalacturonan and short-chain homogalacturonan, while citrus pectin consists of short-chain rhamnogalacturonan and long-chain homogalacturonan. For SSPS, homogenous galactosyl and arabinosyl neutral sugar side chains combine with the rhamnogalacturonan region through rhamnose and are longer than the galacturonosyl main backbone.

SSPS has a galacturonic acid content of about 20% [19] whereas pectin has a galacturonic acid content of at least 65%. The anion group of this acid probably binds to the surface of cationic protein particles so that SSPS protects the casein micelles. It is assumed that the adsorbed layer of SSPS is thick, because each molecule is rich in side chains of galactose and arabinose [19]. SSPS is soluble in both cold and hot water without gelation and shows a relatively low viscosity compared to the viscosity of other gums/stabilisers. Acid, heat or salts (e.g. Ca-salts) do not significantly affect the viscosity of SSPS in solution. Under acidic conditions, SSPS prevents protein particles from aggregation and precipitation.

Unlike HE pectin, the point of interest with SSPS is its ability to stabilise protein particles at low pH conditions without raising the viscosity of the acidified protein beverage. SSPS is reported to perform even if applied at an early stage of processing before fermentation, which allows the manufacturing process to be improved. SSPS shows good stabilising effect in lower pH products (below pH4.0). However, SSPS is less effective than HE pectin at higher pH such as around pH4.4 and/or high milk solid non-fat (MSNF) contents.

The need exists to provide alternative stabilisers which may be added during the production of fermented protein products prior to fermentation and preferably prior to the initial pasteurisation.

The present invention alleviates the problems of the prior art.

Statement of Invention

In one aspect the present invention provides a process for the production of a food product comprising the steps of (i) contacting a food material with a stabiliser to provide a food intermediate; and (ii) fermenting the food intermediate; wherein the stabiliser comprises a depolymerised pectin and wherein the food material comprises a protein.

In one aspect, the present invention provides a process for the production of a food product comprising the step of dissolving a stabiliser directly in a food material wherein the stabiliser comprises a depolymerised pectin and wherein the food material comprises a protein.

In another aspect, the present invention provides a food product obtained or obtainable by the process of the present invention.

In a further aspect, the present invention provides use of a stabiliser for improving the texture and/or viscosity of a food product, wherein the stabiliser comprises a depolymerised pectin.

The term "food products" as used herein means a substance that is suitable for human or animal consumption. It will be readily understood that whilst the food product is the product of the process as herein described, it may undergo further processing prior to consumption.

The term "stabiliser" as used herein means a substance which is capable of stabilising protein in a system with which it is contacted—so as to prevent or substantially reduce aggregation and/or sedimentation and/or separation. The "system" may, for example, be a food material comprising a protein, a food intermediate comprising a protein or a food product comprising a protein. Preferably the "system" is a food product comprising a protein.

The term "food material" as used herein means one or more ingredients of the food product.

The term "fermenting" as used herein typically means a process in which desirable chemical changes are brought about in an organic substrate through the action of microbes and/or microbial enzymes. The fermenting conditions typically include attaining and maintaining a specified temperature for a specified period of time. It will be readily appreciated that the temperature and duration may be selected in order to enable the biochemical processes associated with fermentation, especially the breakdown of organic compounds by micro-organisms to progress to a desired extent. The organic compounds may, for example, be carbohydrates, especially sugars such as lactose.

The term "depolymerised pectin" as used herein means a substance obtained or obtainable from naturally-occurring pectin by breaking it down into two or more fragments. Pectin has a backbone comprising repeated structural units and typically has a degree of polymerisation of up to 800 units. These repeated structural units are principally galacturonic acid residues and rhamnopyranosyl residues. The depolymerised pectin has chains of no greater than 250 units, such as chains of 15 to 250 units. Typically these units are galacturonic acid units. The naturally-occurring pectin may be broken down by any suitable depolymerisation method, such as various mechanical, chemical, thermal, enzymatic or irradiative methods or combinations of the same. Suitable depolymerisation methods include those discussed in Studies on Pectin Degradation, W. H. Van Deventer-Schriemer and W. Pilnik, Acta Alimentaria, vol. 16 (2), pp. 143-153 (1987). The term "depolymerised pectin" also includes those substances, for example naturally-occurring substances, which have short chains of 15 to 250 units and in particular short galacturonan chains of 15 to 250 galacturonic acid units.

Advantages

We have surprisingly found that a stabiliser comprising a depolymerised pectin can be applied directly to a protein-containing food material, such as milk, prior to fermentation and yet stabilise the resultant food product which may, for example, be a fermented dairy product.

Prior art stabilisers such as high molecular weight pectin induce phase separation if added to protein-containing food materials such as milk prior to fermentation. Therefore traditionally it has been necessary to add a stabiliser after fermentation in order to achieve the desired stabilisation of the food product.

A further advantage is that the method of addition of the stabiliser is more flexible, since both direct addition as dry mix with sugar and dispersion in a saturated sugar solution may be used as alternatives to the dissolved stabiliser solution.

We have also surprisingly found that a stabiliser comprising a depolymerised pectin dissolves more easily directly in a food material such as milk than other stabilisers such as pectin. The present stabiliser may therefore be dissolved directly in the food material avoiding the need for a separate dissolution step. This further simplifies the production process.

For ease of reference, these and further aspects of the present invention are now discussed under appropriate section headings. However, the teachings under each section are not necessarily limited to each particular section.

Preferred Embodiments

Process

As previously mentioned, in one aspect the present invention provides a process for the production of a food product comprising the steps of (i) contacting a food material with a stabiliser to provide a food intermediate; and (ii) fermenting the food intermediate; wherein the stabiliser comprises a depolymerised pectin and wherein the food material comprises a protein.

In one aspect, the present invention provides a process further comprising, before step (ii), the step of (i)(a) pasteurising the food intermediate. In other words, the present invention provides a process for the production of a food product comprising, in the following order, the steps of (i) contacting a food material with a stabiliser to provide a food intermediate; (i)(a) pasteurising the food intermediate; and (ii) fermenting the food intermediate; wherein the stabiliser comprises a depolymerised pectin and wherein the food material comprises a protein.

The term "pasteurising" as used herein means reducing or eliminating the presence of live organisms (for example, microorganisms) within the food material. Preferably, pasteurisation is attained by maintaining a specified temperature for a specified period of time. The specified temperature is usually attained by heating. It will be readily appreciated that the temperature and duration may be selected in order to kill or inactivate certain bacteria, such as harmful bacteria. A rapid cooling step may follow.

We have surprisingly found that a stabiliser comprising a depolymerised pectin can be applied directly to a protein-containing food material, such as milk, prior to pasteurisation and fermentation and yet stabilise the resultant food product which may, for example, be a fermented dairy product.

This embodiment of the present invention is particularly advantageous when the food product does not undergo a final pasteurisation step, for example because it comprises a live culture. In applications such as these, this process allows the manufacturer of the food product to avoid separate pasteurisation of the stabiliser since the stabiliser and the food material may be pasteurised together prior to fermentation. This leads to benefits in terms of lower energy and equipment costs, reduced processing time and a simplified processing procedure. In particular the energy costs, tank capacity and heat equipment associated with the separate pasteurisation of the stabiliser are not required.

In one aspect, the present invention provides a process further comprising, before step (ii), the step of (i)(b) inoculating the food intermediate.

The term "inoculating" as used herein means introducing a micro-organism into a system. The micro-organism may, for example, be a bacterium and may be used to start a culture.

According to this aspect, the present invention may provide a process for the production of a food product comprising, in the following order, the steps of (i) contacting a food material with a stabiliser to provide a food intermediate; (i)(b) inoculating the food intermediate; and (ii) fermenting the food intermediate; wherein the stabiliser comprises a depolymerised pectin and wherein the food material comprises a protein.

In a highly preferred aspect, the present invention provides a process for the production of a food product comprising, in the following order, the steps of (i) contacting a food material with a stabiliser to provide a food intermediate; (i)(a) pasteurising the food intermediate; (i)(b) inoculating the food intermediate; and (ii) fermenting the food intermediate.

In a preferred aspect, the process further comprises the step of (iii) pasteurising the product of step (ii).

In another preferred aspect, the process further comprises the step of (iv) adding juice and/or acid to the product of step (i)(b) and/or to the product of step (ii) and/or to the product of step (iii).

Stabiliser

As previously mentioned, the stabiliser for use in the present invention comprises a depolymerised pectin.

In a preferred aspect, the depolymerised pectin has a viscosity at 25° C. in a 5% solution of 15 to 400 cP, such as 20 to 300 cP, 20 to 200 cP, 20 to 100 cP or 25 to 50 cP. Typically the viscosity is measurable in accordance with the method described below.

In one preferred aspect, the stabiliser has a viscosity at 25° C. in a 5% solution of greater than 150 cP, such as greater than 150 cP to 400 cP, for example greater than 150 cP to 300 cP or greater than 150 cP to 200 cP. Typically the viscosity is measurable in accordance with the method described below.

Preferably the depolymerised pectin is an essentially linear carbohydrate polymer. This is in direct contrast to SSPS which is an essentially branched carbohydrate polymer.

The term "carbohydrate polymer" as used herein means a molecule comprising substantially only carbon, hydrogen and oxygen atoms and which comprises repeated structural units of carboxylated polyhydroxy aldehydes. Preferably at least 90% of the atoms in the carbohydrate polymer are carbon, hydrogen or oxygen atoms, more preferably at least 98%, such as 99% or 100%.

The carbohydrate polymer may comprise a main backbone substituted with one or more side chains.

The term "essentially linear" means that the total number of atoms in the backbone is greater than the total number of atoms in the side chains.

As previously mentioned, the depolymerised pectin comprises no greater than 250 repeated structural units. Preferably the depolymerised pectin comprises 15 to 250 units, such as 15 to 200 units, 20 to 150 units or 30 to 100 units. Preferably the repeated structural units are galacturonic acid residues and/or rhamnopyranosyl residues.

In one aspect, the depolymerised pectin comprises no greater than 250 galacturonic acid units. Preferably the depolymerised pectin comprises 15 to 250 galacturonic acid units, such as 15 to 200 galacturonic acid units, 20 to 150 galacturonic acid units, or 30 to 100 galacturonic acid units. In a preferred aspect, the depolymerised pectin has a galacturonic acid content of at least 65%, such as at least 70% or at least 75% or at least 80%. The galacturonic acid content may be measured using the method described in [3].

In one aspect, preferably the depolymerised pectin has a degree of esterification of at least 50%, such as at least 60%, or at least 65%. In this aspect, preferably the depolymerised pectin has a degree of esterification from 50 to 90% such as from 50 to 85%, more preferably from 65 to 75%. In a highly preferred embodiment the depolymerised pectin has a degree of esterification of about 70%. Such depolymerised pectins are hereinafter referred to as "high ester depolymerised pectins". Thus, in one preferred embodiment, the depolymerised pectin is a high ester depolymerised pectin (HE-DPP).

A depolymerised pectin having a degree of esterification at least 50% may be particularly advantageous in a process for the production of a yoghurt, especially a yoghurt beverage, although for a yoghurt a degree of esterification below 50% may also be suitable.

In another aspect, preferably the depolymerised pectin has a degree of esterification of less than 50%, for example, less than 40% or less than 30% or less than 20%. Such depolymerised pectins are hereinafter referred to as "low ester depolymerised pectins". Thus, in one preferred embodiment, the depolymerised pectin is a low ester depolymerised pectin (LE-DPP).

In one particularly preferred embodiment of the invention, for example a stirred yoghurt, the depolymerised pectin has a degree of esterification of from about 20% to about 50%, more preferably about 30% to about 50%, more preferably still, from 40% to about 50%.

Depolymerised pectins with varying degree of esterification can be prepared by partial chemical or enzymatic deesterification of any depolymerised pectin or pectic product. The chemical deesterification reactions [20, 21] involve the acidic hydrolysis of methyl ester groups in aqueous or partially aqueous medium by the use of organic or mineral acids, or the basic hydrolysis of methyl ester groups in aqueous or partially aqueous medium by alkali metal or alkaline earth metal hydroxides, carbonates or strong bases such as ammonia or substituted amines. The enzymatic deesterification of depolymerised pectin can be achieved by the use of plant pectinesterase, fungal pectinesterase or bacterial pectinesterase or combinations of these at pH, temperature and ionic strength, that are compatible with the working conditions of the enzyme [24, 25].

The deesterification reactions can be carried out chemically or enzymatically on moistened depolymerised pectin raw material, crude pectin extracts, pectin concentrates or on precipitated pectin or partially dried pectin as well as redissolved pectin, suspended pectin or partially dissolved or moistened pectin.

In another aspect of the invention the depolymerisation process can be one of or a combination of the below-mentioned depolymerisation processes used after or simultaneously with the deesterification of the pectin or pectic product by one of the above-mentioned deesterification methods.

A "pectic product" is defined as any form of pectin or modified pectin as it occurs in plant, pectin raw materials, and pectin processing streams or isolated pectin products.

In one preferred embodiment of the invention, the depolymerised pectin is amidated.

Depolymerised amidated pectins with varying degree of amidation can be prepared by treating any depolymerised pectin or pectic product in solution, suspension or as a moistened product with ammonia water or gaseous ammonia at suitable ammonia concentration, temperature and time to give a predetermined degree of amidation [22, 23]. Depolymerisation by the processes described hereinafter can be carried out during or after amidation of pectin. Often it is convenient to obtain both a lower degree of esterification and a partial amidation in the same depolymerised pectin product by carrying out one of the above mentioned deesterification process before, during or after the amidation process.

A depolymerised pectin having degree of amidation less than 25%, such as less than 20% or less than 10% or less than 5% may be advantageous in some aspects.

Thus, in one particularly preferred embodiment, the depolymerised pectin is amidated LE depolymerised pectin.

In another particularly preferred embodiment, the depolymerised pectin is amidated HE depolymerised pectin.

The depolymerised pectin may be prepared from pectin by any suitable depolymerisation method and the pectin may be obtained from any suitable source. Examples of sources of pectin are citrus fruits (lemon, lime, orange, grapefruit, mandarine, tangarine, pommelo etc.) apple, sugarbeet root, carrot, sunflower head residue, onion, peach, grape berry, mango, guava, squash, pumpkin, tomato, apricot, banana, bean and potato. The pectin may be a commercially available pectin. In one aspect, the depolymerised pectin is obtainable, preferably obtained from citrus fruits.

Alternatively, the depolymerised pectin may be prepared from one of the sources of pectin directly, without first isolating the pectin, and the depolymerised pectin may subsequently be extracted. For example, the depolymerisation of pectin can be carried out in harvested plant material, after processing of plant material, for example in plant residues from juice production before or after drying. The depolymerisation can also be carried out during pectin processing: before the pectin extraction, during pectin extraction or in the pectin juice or concentrate after the pectin extraction. It is also possible to carry out the depolymerisation in wet precipitated pectin, during drying of pectin or in dry pectin after the pectin has been isolated for example, in dry pectin, moistened pectin, dissolved pectin or suspended pectin.

Depolymerisation methods include various mechanical, chemical, thermal, enzymatic and irradiative methods or combinations of any thereof, in particular those methods capable of breaking down long chains such as long galacturonan chains into shorter chains, for example into chains of 15 to 100 repeated structural units such as galacturonic acid units.

The chemical depolymerisation methods could be acid, alkaline, oxidative or reductive methods. Acid depolymerisation is shown in Mazoyer et al. UK Patent Application GB 2,311,024 (1997). Alkaline depolymerisation of pectin by β-elimination was studied by Renard et al., in Visser & Voragen, Pectins and Pectinases pp. 603-608 (1996) and Sajjaanantakul et al., J. Food Sci., 54: 1272-1277 (1989). Oxidative depolymerisation of polysaccharides was studied by Miller in Biochemical and Biophysical Research Communications Vol 141, pp. 238-244 (1986). Examples of thermal depolymerisation studies are given in Merril and Weeks, J. Am. Chem. Soc., 67: 224 (1945), Mitchell et al. U.S. Pat. No. 5,498,702 (1996). Enzymatic depolymerisation of pectin by polygalacturonase, pectin lyase or pectate lyase has been widely recommended for depolymerisation of pectic substance both in plant material as well as in pectin extracts.

The depolymerised pectin may be prepared by the following general procedure. Pectin, for example a commercially available pectin, is dissolved in demineralised water at 85-90° C. to constitute a 5% solution. The pH of the solution is adjusted to 5.5 by addition of 20% sodium carbonate solution. The solution is kept at 80° C. for 2 to 8 hours until the viscosity of the solution (measured at 25° C.) is lowered to 30 to 50 cP. The pH is subsequently lowered to 3.5 by addition of 30% nitric acid and the mixture is cooled to room temperature. Pectin is precipitated out of the solution by pouring the mixture in 3 volume parts 80% isopropyl alcohol under good agitation. After approximately four hours the precipitate is separated from the liquid by filtration through a cloth and washed with another part of 80% isopropyl alcohol. After pressing in the cloth the material is dried in a ventilated oven at 60° C. during the night. Finally the dried product is milled to obtain depolymerised pectin.

The stabiliser comprising depolymerised pectin may be provided in any suitable form, in particular as a dry mix, as a solution or as a dispersion. As previously mentioned, step (i) of the process is contacting a food material with a stabiliser. This may be done in any suitable manner. In one aspect, the stabiliser is dry mixed with sugar and then dissolved in water to provide a stabiliser solution. The stabiliser solution is then mixed with a food material such as milk with stirring to provide the food intermediate.

In addition to the depolymerised pectin, the stabiliser may comprise other components such as dextrose. In one embodiment, the stabiliser comprises a depolymerised pectin and a high molecular weight high ester pectin.

The term "high molecular weight, high ester pectin" means a pectin having a viscosity in a 5% solution at 25° C. of more than 400 cP and a degree of esterification of at least 50%.

In one embodiment the stabiliser comprises essentially only a depolymerised pectin.

In another embodiment the stabiliser comprises at least one depolymerised pectin.

In one preferred embodiment of the invention, the stabiliser is in the form of a blend. For example, the stabiliser may comprise two or more depolymerised pectins, or a mixture of one or more depolymerised pectins and one or more high molecular weight (HMW) pectins.

Thus, the stabiliser may comprise a blend of two or more depolymerised pectins selected from the following:
 HE depolymerised pectin;
 LE depolymerised pectin;
 amidated HE depolymerised pectin;
 amidated LE depolymerised pectin;
which may be optionally combined with one or more high molecular weight pectins.

In one particularly preferred embodiment, the stabiliser comprises a mixture of two or more depolymerised pectins, i.e. the stabiliser is a blend of two or more different depolymerised pectins.

In one particularly preferred embodiment, the stabiliser comprises a LE depolymerised pectin and a HE depolymerised pectin, wherein the LE depolymerised pectin and HE depolymerised pectin are as defined hereinabove.

In another particularly preferred embodiment, the stabiliser comprises a LE depolymerised pectin and a HE depolymerised pectin in a ratio of about 10:1 to 1:10, more preferably about 5:1 to 1:5, more preferably still about 3:1 to 1:3, more preferably still about 2:1 to 1:2.

In one especially preferred embodiment, the stabiliser comprises a LE depolymerised pectin and a HE depolymerised pectin in a ratio of about 1:1.

In another especially preferred embodiment, the stabiliser comprises a LE depolymerised pectin and a HE depolymerised pectin in a ratio of about 2:1.

In one particularly preferred embodiment, the stabiliser comprises about 64% LE depolymerised pectin and about 36% HE depolymerised pectin.

As mentioned above, the one or more depolymerised pectins of the invention may be combined with a high molecular weight pectin. Thus, in one preferred embodiment, the stabiliser comprises a LE depolymerised pectin and a HMW pectin. In an alternative preferred embodiment, the stabiliser comprises a HE depolymerised pectin and a HMW pectin.

The HMW pectin (for use in combination with the depolymerised pectin) for use in the processes of the invention, for example in the stabilisation of drinking yoghurt, can be selected from a HMW pectin with a degree of esterification from 60-85% and preferably from 65-75%. In order to prevent the problems associated with the use of high dosages of HMW pectin in preparation of fermented protein foods, the dosage of HMW pectin used in combination with the depolymerised pectin is preferably lower than 0.15%, 0.1%, 0.75%, or 0.5%, and/or the ratio of HMW to depolymerised pectin used in the process of the invention, should preferably not exceed 50%, more preferably not exceed 40%, and more preferably still not exceed 30%. More preferably, the dosage of HMW pectin used in combination with the depolymerised pectin is lower than 0.15%.

In one particularly preferred embodiment, the ratio of HMW pectin to depolymerised pectin is about 30%. Such blends are observed to be particularly advantageous.

Suitable HMW pectins for use in the processes of the present invention include, but are not limited to the following:
 GRINDSTED Pectin AMD 760, 780, 781, 782, 783, 382, 383
 GRINDSTED Pectin RS 400, 450, 461
 Unipectine AYD 10, 20, 22, 28, 29, 258, 30, 31, 35, 250, 358
 Citrico type 7010, 7016, 7017, 7050, 7051, 7052, 7060, 7062, 7063
 Classic CM 201, 203
 Genupectin YM 100, 200, 115L, 115H, 150L, 150H; JM 150, 240; JMJ
 Obipektin Brown Ribbon, Brown Ribbon K, Brown Ribbon P, Brown Ribbon Q In yet another preferred embodiment of the invention, the stabiliser comprises a LE depolymerised pectin and a HE depolymerised pectin, each of which may be optionally amidated.

In one preferred embodiment, the stabiliser comprises an amidated LE depolymerised pectin and a HE depolymerised pectin. More preferably, the stabiliser comprises an amidated LE depolymerised pectin and a HE depolymerised pectin in a ratio of about 10:1 to 1:10, more preferably about 5:1 to 1:5, more preferably still about 3:1 to 1:3, more preferably still about 2:1 to 1:2. More preferably still, the stabiliser comprises about 64% of an amidated LE depolymerised pectin and about 32% of a HE depolymerised pectin.

In another preferred embodiment, the stabiliser comprises a LE depolymerised pectin and an amidated HE depolymerised pectin.

In yet another preferred embodiment, the stabiliser comprises an amidated LE depolymerised pectin and an amidated HE depolymerised pectin.

In another preferred embodiment, the stabiliser comprises an amidated depolymerised pectin and a HMW pectin.

Thus, in one preferred embodiment, the stabiliser comprises an amidated LE depolymerised pectin and a HMW pectin. In another preferred embodiment, the stabiliser comprises an amidated HE depolymerised pectin and a HMW pectin.

The exact dosage of depolymerised pectin used in the invention is dependant on the viscosity and the type of depolymerised pectin used, and whether a mixture of LE/HE and/or amidated types of depolymerised pectin are used, and whether the depolymerised pectin or mixture thereof is used in conjunction with a suitable dosage of a HMW pectin. Different depolymerised pectins, or mixtures thereof, or blends thereof with HMW pectin, may be preferred for different food products; for example, LE depolymerised pectin, or a blend of LE and HE depolymerised pectin is preferred in stirred yoghurt, whereas HE depolymerised pectin is preferred for use in drinking yoghurt. This is further illustrated in the accompanying examples. The optimum dosage of depolymerised pectin used can be readily determined by the person of ordinary skill in the art by routine experimentation using the methods set herein.

Typically, depolymerised pectin of higher viscosity, within the range of the invention, can be used at a lower dosage whilst still achieving the technical effects beneficial to the methods of the invention. The dosage may also be dependent on the degree of esterification, although this will also depend on whether a pure depolymerised pectin or blend of depolymerised pectins is used. Typically depolymerised pectin with a higher esterification value can be used at a higher dosage whilst still achieving the technical effects beneficial to the methods of the invention. As mentioned above, it is possible to use an amidated depolymerised pectin in the invention. When using an amidated depolymerised pectin the degree of esterification can be lower, whilst retaining the dosage levels obtained whilst using a depolymerised pectin with a higher degree of esterification.

Food Material

As previously mentioned the food material comprises a protein. Preferably the protein is of animal, and/or vegetable, and/or microbial origin. The protein may have been isolated from a suitable source, for example as a protein powder or protein isolate.

A suitable food material comprising protein of animal origin may be, for example, cows' milk, buffalo milk, goat milk or sheep milk. A suitable food material comprising protein of vegetable origin may be or may be derived from, for example soy, rice, wheat, oat, pea or coconut.

In a preferred aspect, the food material comprises protein of animal origin and protein of vegetable origin. Preferably, the food material comprises protein of animal origin. Preferably the protein is a milk protein.

In one preferred aspect the food material comprises milk. In one aspect the milk is selected from the list consisting of cows' milk, buffalo milk, goat milk and sheep milk. The milk may be whole fat milk or a partially defatted milk. In one aspect the food material comprises milk and a protein of vegetable origin. The protein of vegetable origin could be, for example, soya protein or rice protein.

Preferably, the milk has milk solid non-fat content of 0.1 to 25 wt %, preferably 3 to 25 wt %, more preferably 9 to 25 wt %.

The food material may comprise other food ingredients such as emulsifiers, hydrocolloids, preservatives, antioxidants, colourings, flavourings, acidulants and sweeteners.

Pre-Fermentation Pasteurisation

As previously mentioned, in one aspect, the process of the present invention comprises the step of (i)(a) pasteurising the food intermediate.

Preferably the pasteurising step (i)(a) takes place at a temperature of at least 80° C., preferably at least 90° C. More preferably the pasteurising step (i)(a) takes place at a temperature of at least 95° C., such as 95° C. to 100° C. In one aspect, preferably the pasteurising step (i)(a) takes place at a temperature of about 95° C. In one aspect, preferably the pasteurising step (i)(a) takes place at a temperature of at least 100° C.

Preferably the pasteurising step (i)(a) takes place over a period of 1 to 20 minutes, preferably 5 to 15 minutes, such as about 10 minutes.

In a preferred aspect the pasteurising step (i)(a) takes place at a temperature of about 95° C. for about 10 minutes.

Inoculation

As previously mentioned, in one aspect, the process of the present invention comprises the step of (i)(b) inoculating the food material.

Preferably the inoculation step (i)(b) comprises the addition of a live food-grade micro-organism. Preferably the live food-grade micro-organism is a live food-grade bacterium. Preferably the live food-grade bacterium is capable of influencing the taste and/or aroma and/or texture of the food product. In one aspect preferably the live food-grade bacterium is capable of influencing the taste of the food product. In another aspect preferably the live food-grade bacterium is capable of influencing the aroma of the food product. In a further aspect preferably the live food-grade bacterium is capable of influencing the texture of the food product. Preferably the live food-grade bacterium is capable of influencing the taste, aroma and texture of the food product.

The term "capable of influencing the taste and/or aroma and/or texture" means capable of altering the taste and/or aroma and/or texture of the food product as compared with the food product in the absence of the live food-grade bacterium.

Preferably the live food-grade micro-organism is a probiotic bacterium.

The term "probiotic bacterium" means a bacterium that has a beneficial effect on human and/or animal health. A probiotic bacterium may act in the gastrointestinal tract and/or in the urogenital tract. The health benefits of the probiotic bacterium may include:

antagonistic effects on pathogenic bacteria
    beneficial metabolic activities such as production of vitamins or bile salt hydrolase activity
    stimulation of the immune response
    protection against early events in carcinogenesis
    improved recovery from intestinal disorders In a preferred aspect, the live food grade micro-organism is selected from the list consisting of *Bifidobacteria, Streptococcus thermophilus, Lactobacilli* and mixtures thereof. Preferably the live food grade micro-organism is selected from the list consisting of *Bifidobacteria, Streptococcus thermophilus, Lactobacillus casei, Lactobacillus rhamnosus, Lactobacillus bulgaricus* and mixtures thereof. In a preferred aspect, the live food-grade micro-organism comprises *Lactobacillus bulgaricus* and/or *Streptococcus thermophilus*, preferably *Lactobacillus bulgaricus* and *Streptococcus thermophilus*.

Preferably the live food-grade micro-organism is added in an amount of 0.01 to 0.05 wt % of the food intermediate. Preferably the live food-grade micro-organism is added in an amount of 0.01 to 0.03 wt %.

Fermentation

As previously mentioned, the process of the present invention comprises the step of (ii) fermenting the food intermediate.

Preferably the fermentation step (ii) takes place at a temperature of from 30 to 50° C., preferably 35 to 45° C., more preferably 37 to 43° C.

In a preferred aspect, the fermentation step (ii) takes place at a temperature of about 42° C.

Preferably the fermentation step (ii) takes place over a period of 2 to 48 hours.

In a preferred aspect, the fermentation step (ii) takes place at a temperature of about 42° C. over a period of 2 to 10 hours, preferably 4 to 8 hours.

Post-Fermentation Pasteurisation

As previously mentioned, in one preferred aspect, the process of the present invention further comprises the step of (iii) pasteurising the product of step (ii).

Preferably the pasteurising step (iii) takes place at a temperature of at least 80° C., preferably at least 85° C. More preferably the pasteurising step (iii) takes place at a temperature of at least 90° C., such as 90° C. to 100° C. In one aspect, preferably the pasteurising step (iii) takes place at a temperature of about 90° C. In another aspect, preferably the pasteurising step (iii) takes place at a temperature of above 100° C.

Preferably the pasteurising step (iii) takes place over a period of 5 to 30 seconds, preferably 10 to 20 seconds, more preferably about 15 seconds.

In a preferred aspect, the pasteurising step (iii) takes place at a temperature of about 90° C. over a period of about 15 seconds.

This final post-fermentation pasturisation step may be included to provide a long shelf-life product. In a preferred aspect, the food product has a shelf-life of more than seven days, preferably more than 14 days, more preferably more than 28 days. In one preferred aspect the food product has a shelf-life of more than three months, preferably more than four months, more preferably more than five months, such as more than six months.

pH Adjustment

As previously mentioned, in another preferred aspect, the process further comprises the step of (iv) adding juice and/or acid to the product of step (i)(b) and/or to the product of step (ii) and/or to the product of step (iii). Preferably the juice and/or acid is added to the product of step (ii) and/or to the product of step (iii). Preferably the juice and/or acid is added to the product of step (ii).

Preferably the juice is a fruit juice. Examples of suitable fruit juices include apple juice, apricot juice, banana juice, grapefruit juice, grape juice, guava juice, lemon juice, lime juice, mandarine juice, mango juice, orange juice, peach juice, pommelo juice, pumpkin juice, squash juice, tangarine juice, tomato juice and mixtures thereof.

The juice may be a natural or a treated juice (such as a concentrated juice or a juice having one or more components separated therefrom.) Preferably the juice is pasteurised at a temperature of at least 80° C., such as at least 85° C. or at least 95° C. prior to addition.

Preferably the acid is a food acid. Examples of suitable food acids include citric acid, malic acid, and lactic acid. In this aspect, preferably the food acid is citric acid, lactic acid or a mixture thereof.

The addition of juice and/or acid may modify the pH of the system and typically lowers the pH of the system.

In a preferred aspect the pH of the food intermediate immediately prior to the fermentation step (ii) is, or is adjusted to pH 6.0 to 8.0, preferably pH 6.3 to 7.0, such as pH 6.5 to 7.0, more preferably about pH 6.7.

In a preferred aspect, the juice and/or acid is added to the product of the fermentation step (ii). Preferably, sufficient juice and/or acid is added to adjust the pH to less than pH 4.6, preferably less than pH 4.4, preferably less than pH 4.2, more preferably about pH 4.0.

Food Product

In one aspect the present invention provides a food product obtained by the process of the present invention. In another aspect the present invention provides a food product obtainable by the process of the present invention.

The food product obtainable, preferably obtained by the process of the present invention may be any suitable fermented protein-containing food product.

Examples of suitable food products include cheese, quarg, sour cream, imitation sour cream (e.g. with vegetable oil), dessert cream, fermented dessert products (such as set or stirred yoghurt desserts and yoghurt mousse), frozen fermented products (such as frozen yoghurt or frozen, fermented ice cream), lassi drink, ayran, laban, buttermilk, kefir drink (lactic acid and alcohol fermentation), liquid yoghurt (such as drinking yoghurt), lactic acid bacteria beverages, blends of fermented protein beverages and juice, pulp, fruit etc. based on e.g. milk, whey and/or soy (this could be yoghurt mixed with juice like a smoothie which is not the same as a milk juice drink directly acidified by the juice), fortified drinks (such as calcium-fortified drinking yoghurt) and protein enriched soft drinks. Other suitable food products include any of the above listed food products which comprise soy protein in addition to or instead of milk protein.

Preferably the food product contains a live food-grade micro-organism in an amount of from 0.01 to 0.05 wt %, more preferably 0.01 to 0.03 wt %, preferably, 0.02 wt %.

Preferably the food product contains the stabiliser in an amount of 0.1 to 5.0 wt %, preferably 0.2 to 4.0 wt %, preferably 0.3 to 3.0 wt %.

Preferably the food product contains the depolymerised pectin in an amount of 0.1 to 1.0 wt %, preferably 0.2 to 0.8 wt %, preferably 0.4 to 0.7 wt %. In one aspect preferably the food product contains the depolymerised pectin in an amount of no greater than 0.4 wt % such as 0.4 wt % to 0.1 wt %, or 0.4 wt % to 0.2 wt % or 0.4 wt % to 0.3 wt %.

In one aspect the food product is a beverage.

Preferably the food product is a fermented milk drink, preferably a yoghurt drink, more preferably a drinking yoghurt drink.

The term "fermented milk drink" covers a food product produced by any kind of fermentation by any kind of organism.

In one particularly preferred embodiment of the invention, the food product is a yoghurt drink.

The term "yoghurt drink" typically covers a milk product produced by fermentation by the combination of *Lactobacil-*

*lus bulgaricus* and *Streptococcus thermophilus*. The term yoghurt drink includes diluted milk drinks with a low MSNF content.

In another particularly preferred embodiment of the invention, the food product is a drinking yoghurt drink.

The term "drinking yoghurt drink" typically covers a milk product produced by fermentation by the combination of *Lactobacillus bulgaricus* and *Streptococcus thermophilus*. Drinking yoghurt drinks typically have a milk solid non-fat content of 8% or more. Furthermore, the live culture count for drinking yoghurt drinks is typically at least $10^6$ cell forming units (CFU).

Where the food product is a drinking yoghurt drink, preferably the stabiliser comprises a HE depolymerised pectin or a blend of a depolymerised pectin and a HMW pectin. Preferably, the stabiliser comprises a HE depolymerised pectin, or a blend of a HE depolymerised pectin and a HMW pectin. Preferably, where the stabiliser is a blend, the ratio of HE depolymerised pectin to HMW pectin is as defined hereinabove.

For drinking yoghurt drink, in one particularly preferred embodiment, the stabiliser has a viscosity at 25° C. in a 5% solution of greater than 150 cP, more preferably from 150 to 400 cP, even more preferably from 300 to 400 cP, more preferably still, about 400 cP. In another particularly preferred embodiment, the stabiliser has a viscosity at 25° C. in a 5% solution of about 25 to 50 cP, more preferably about 40 cP.

For drinking yoghurt drink, preferably the stabiliser has a degree of esterification of from 50 to 85%, more preferably from 56 to 75%, more preferably still, at least 70%.

For drinking yoghurt drink, preferably the stabiliser is selected from those set forth in Examples 1 and 2, i.e. the stabiliser is selected from DPP2, DPP4, or a mixture of DPP4 and a HMW pectin (e.g. GRINSTED® Pectin AMD 780).

For drinking yoghurt, preferably, the stabiliser comprises from 0.4 to 0.7 wt % of the depolymerised pectin or blend thereof. In one particularly preferred embodiment the stabiliser comprises a blend of about 0.3 wt % DPP4 and about 0.1 wt % of a HMW pectin (e.g. GRINSTED® Pectin AMD 780). In another particularly preferred embodiment the stabiliser comprises about 0.4 wt % DPP4, or about 0.5% DPP2.

In another preferred embodiment of the invention, the food product is stirred yoghurt.

The term "yoghurt" typically covers a milk product produced by fermentation by the combination of *Lactobacillus bulgaricus* and *Streptococcus thermophilus* or any other appropriate combination of microorganisms. Yoghurt is a well known and discribed product type, as for example by Tamine & Robinson [26]. More precisely, a summary of the prior art concerning yoghurt is given in U.S. Pat. No. 4,289,789 [27].

The term "stirred yoghurt" specifically refers to a yoghurt product which sustains a mechanical treatment after fermentation, resulting in a destructuration and liquefaction of the coagulum formed under the fermentation stage. The mechanical treatment is typically but not exclusively obtained by stirring, pumping, filtrating or homogenising the yoghurt gel, or by mixing it with other ingredients. Stirred yoghurts typically but not exclusively have a milk solid non-fat content of 9 to 15%.

Where the food product is stirred yoghurt, preferably the stabiliser comprises a LE depolymerised pectin, or a blend of LE depolymerised pectin and a HE depolymerised pectin. More preferably, the stabiliser comprises a LE depolymerised pectin and a HE depolymerised pectin in the ratios defined hereinabove. More preferably still, the stabiliser comprises a LE depolymerised pectin and a HE depolymerised pectin in a ratio of about 64% to 36%.

For stirred yoghurt, in another embodiment, the stabiliser comprises a HE depolymerised pectin, or a blend of a HE depolymerised pectin and a LE amidated depolymerised pectin.

In one particularly preferred embodiment, where the food product is stirred yoghurt, the stabiliser is selected from those disclosed in Examples 3 and 4 set forth below, i.e. the stabiliser is selected from DPP5, DPP6, DPP7. DPP8, DPP9 and DPP10.

Preferably, for stirred yoghurt, the stabiliser has a viscosity of about 20 to 50 cP, more preferably about 40 cP, when measured at 25° C. in a 5% solution.

For stirred yoghurt, in one particularly preferred embodiment, the stabiliser comprises a LE depolymerised pectin used in an amount of from about 0.1% to about 0.5 wt %, more preferably from about 0.2% to about 0.5, more preferably still from about 0.3% to about 0.5%.

For stirred yoghurt, in another particularly preferred embodiment, the stabiliser comprises a HE depolymerised pectin used in an amount of from about 0.1% to about 0.5 wt %, more preferably from about 0.2% to about 0.5, more preferably still from about 0.3% to about 0.5%.

For stirred yoghurt, in one especially preferred embodiment the stabiliser comprises a blend of about 64% LE depolymerised pectin and about 36% HE depolymerised pectin. Preferably, for this embodiment, the stabiliser is used in an amount of from about 0.1% to about 0.5 wt %, more preferably from about 0.2% to about 0.5, more preferably still from about 0.3% to about 0.5%.

For stirred yoghurt, in another especially preferred embodiment the stabiliser comprises a blend of a LE amidated depolymerised pectin and a HE depolymerised pectin used in an amount of from about 0.1% to about 0.5 wt %, more preferably from about 0.2% to about 0.5, more preferably still from about 0.3% to about 0.5%. Preferably, the ratio of LE amidated depolymerised pectin to HE depolymerised pectin is about 64% to 36%.

Preferably the food product has a pH of less than pH 4.6, preferably less than pH 4.4, preferably less than pH 4.2, more preferably about pH 4.0 or less.

Preferably, the food product has a milk solid non-fat (MSNF) content of 0.1 to 20 wt %, preferably 1 to 15 wt %, more preferably 1 to 10 wt %. In one aspect, the MSNF content is less than 3 wt %. In a preferred aspect the MSNF content is at least 3 wt %. In a further preferred aspect, the MSNF content is at least 8 wt %.

Drinking yoghurts typically contain a minimum of 8% by weight of MSNF. Yoghurt drinks typically contain a minimum of 3% by weight of MSNF, whereas soft drinks, milk juice drinks and similar products typically contain less than 3% by weight of MSNF.

As previously mentioned, in a preferred aspect, the food product has a shelf-life of more than seven days, preferably more than 14 days, more preferably more than 28 days. In one preferred aspect the food product has a shelf-life of more than three months, preferably more than four months, preferably more than five months, such as more than six months.

Other Aspects

In one aspect, the present invention provides a process for the production of a food product comprising the step of dissolving a stabiliser directly in a food material wherein the stabiliser comprises a depolymerised pectin and wherein the food material comprises a protein.

In this aspect preferably the stabiliser is in a solid form. The stabiliser may for example be in the form of a powder. The stabiliser may be in the form of a dry mix with sugar.

In this aspect preferably the food material comprises milk, more preferably the food material is milk.

In this aspect, preferably the process is as described herein. In this aspect, preferably the stabiliser is as described herein. In this aspect, preferably the food material is as described herein. In this aspect, preferably the process, the stabiliser and the food material are as described herein.

In one aspect the present invention provides use of a stabiliser for improving the texture and/or viscosity (such as mouthfeel and/or other organoleptic properties) of a food product, wherein the stabiliser comprises a depolymerised pectin. In this aspect preferably the stabiliser further comprises a high molecular weight, high ester pectin. In this aspect, preferably the food product is not a beverage.

The term "high molecular weight, high ester pectin" means a pectin having a viscosity in a 5% solution at 25° C. of more than 400 cP and a degree of esterification of at least 50%.

In this aspect preferably the food product comprises the stabiliser in an amount of 0.1 to 1 wt %, preferably 0.2 to 0.7 wt %, more preferably 0.2 to 0.5 wt %.

Aspects of the invention are defined in the appended claims.

The present invention will now be described in further detail in the following examples.

EXAMPLES

The following abbreviations are used throughout the Examples section:

| | |
|---|---|
| DPP | depolymerised pectin; |
| HE pectin | high ester pectin; |
| LE pectin | low ester pectin; |
| DE | degree of esterification; |
| MSNF | milk solids non-fat; |
| AMD 780 | GRINDSTED ® Pectin AMD 780; |
| SSPS | Soyafibe-S-DA 100; |
| SY 200 | GRINDSTED ® Pectin SY 200; |
| Wave 212 | GRINDSTED ® Pectin Wave 212; |
| SY 640 | GRINDSTED ® Pectin SY 640. |

Viscosity Determination

The viscosity was measured by the following method.

25.00 gram of stabiliser was dissolved in approx. 500 ml demineralised water at 80° C. in a tared beaker to prepare a 5% solution.

The stabiliser solution was cooled to 25° C. and pH was adjusted to 3.5±0.2 by addition of 1 N hydrochloric acid or 20% sodium carbonate solution.

The total weight of the solution was brought to 500.0 gram by dilution with demineralised water.

The viscosity was measured on a Brookfield Viscometer model DV-II with spindle No. 61 (Spindles No. 62 or 63 on case of higher viscosities) at 25° C. at 60 rpm.)

| | PECTIN CONCENTRATION 5% | | |
|---|---|---|---|
| Stabiliser | Viscosity (cP) | (Spindle No.) | pH |
| DPP2 | 35 | (61) | 3.7 |
| Wave 212 | 242– | (62) | 3.4 |

-continued

| | PECTIN CONCENTRATION 5% | | |
|---|---|---|---|
| Stabiliser | Viscosity (cP) | (Spindle No.) | pH |
| SSPS | 9.5– | (61) | 3.5 |
| AMD780 | more than 1000 | (63) | 3.3 |

Wave 212, SSPS and AMD780 are comparative examples.

Determination of Degree of Esterification and Degree of Amidation 5 g of the pectin sample was weighed to the nearest 0.1 mg into a 250 ml beaker and 105 ml of solvent added (a mixture of 100 ml 60% aqueous isopropyl alcohol and 5 ml conc. hydrochloric acid). The mixture was stirred on a magnetic stirrer for 10 minutes and then filtered through a dried and pre-weighed coarse glass filter funnel under vacuum. The residue was washed with six 15 ml portions of the solvent followed by 60% aqueous isopropyl alcohol (6-8 portions of 20 ml) until the filtrate was free from chloride (tested with a solution of 1.7 g silver nitrate in 100 ml of distilled water). Finally, the solid was washed with approx. 30 ml of 100% isopropyl alcohol and dried for 2½ hours in an oven at 105° C. The product was cooled in a desiccator and weighed.

20.00 ml of 0.5 N sodium hydroxide was transferred using a 20 ml volumetric pipette into a beaker and mixed with 20.00 ml of 0.5 N hydrochloric acid, transferred using a 20 ml volumetric pipette. Two drops of a solution of phenolphthalein (1 g of phenolphthalein dissolved in 100 ml of 96% ethanol) indicator was added and the solution titrated with 0.1 N sodium hydroxide. The volume $V_0$ ml was recorded.

Exactly one tenth of the washed and dried pectin was weighed into a 250 ml Erlenmeyer flask and moistened with 2 ml 96% ethanol. The flask was placed on a magnetic stirrer and 100 ml of boiled and cooled deionised water slowly added, avoiding splashing. The flask was stoppered and stirred until all the pectin was completely dissolved. Five drops of the solution of phenolphthalein was added and titrated with 0.1 N sodium hydroxide. The volume was recorded as $V_1$ in ml. 20.00 ml of 0.5 N sodium hydroxide was added and the flask stoppered and shaken vigorously. The content was allowed to rest for 15 minutes in order to saponify the ester groups. 20.00 ml 0.5 N hydrochloric acid was added and the solution shaken until the pink colour disappears. Three drops of the solution of phenolphthalein were added and the solution titrated with 0.1 N sodium hydroxide until a faint pink colour was achieved. The volume of 0.1 N sodium hydroxide required was recorded as $V_2$ ml.

The solution was transferred from the titration quantitatively to a 250 ml round bottom flask and assembled to a dropcollector connected to a condenser with tight connection to a receiver flask through an adapter (Kjeldahl distillation equipment). 20.00 ml of 0.1 N hydrochloric acid was added to the receiver flask. 55±5 ml of 30% sodium hydroxide solution was added to the round bottom flask and the mixture distilled slowly and approx. 120 ml collected. 3 drops of indicator solution (0.4 g of methyl red and 0.6 g of bromcresol green dissolved in 1 1 96% ethanol) were added to the distillate and the solution titrated with 0.1 N sodium hydroxide until the equivalence point (B recorded in ml).

To calculate the degree of esterification:

$$V_3 = 20.00 - B$$

$$\%DE = \frac{V_2 - V_0}{V_1 + V_2 - V_0 + V_3} * 100.$$

Calculate the degree of amidation:

$$\%DA = \frac{V_3}{V_1 + V_2 - V_0 + V_3} * 100$$

Example 1

Objective: To test the performance of a depolymerised pectin added to milk prior to pasteurisation, inoculation and fermentation for production of drinking yoghurt.
Stabiliser GRINDSTED® Pectin AMD1387 was dissolved in demineralised water at 85-90° C. to constitute a 5% solution. pH was adjusted to 5.5 by addition of 20% sodium carbonate solution. The solution was kept at 80° C. for 8 hours until the viscosity of the solution (measured at 25° C.) was lowered to approx 35 cP. Then pH was lowered to 3.5 by addition of 30% nitric acid and the mixture was cooled to room temperature. Pectin was precipitated out of the solution by pouring the mixture in 3 vol. parts 80% isopropyl alcohol under good agitation. After approx. four hours the precipitate was separated from the liquid by filtration through a cloth and washed with another part of 80% isopropyl alcohol. After pressing in the cloth the material was dried in a ventilated oven at 60° C. during the night. The dried product was milled to DPP2.

|  | DPP2 |
|---|---|
| Pectin raw material | Citrus |
| Degree of Esterification: | 69.3% |
| Viscosity, 5% solution at 25° C.: | 34.3 cP |

The depolymerised pectin having a viscosity of 34.3 cP (DPP2) was used in the following example.

The following commericial stabilisers were also used as comparative examples: GRINDSTED® Pectin AMD 780 (AMD 780), GRINDSTED® Pectin Wave 212 (Wave 212), and Soyafibe-S-DA 100 (soluble soybean polysaccharide, SSPS, produced by Fuji Oil Co., Ltd., Japan). GRINDSTED® products are available from Danisco A/S.

Recipe conditions: The final drinking yoghurt was characterised by a milk solid non-fat content (MSNF) of 8%, a sugar content of 8%, a fat content of 0.1%, and a pH of 4.0-4.1. The stabilisers were applied in the following concentrations (% w/w of total drink composition):

| DPP2 | 0.5% |
|---|---|
| Wave 212: | 0.5% |
| AMD 780: | 0.4% |
| SSPS: | 0.4% |
| SSPS: | 0.5% |

Process conditions: Skimmed milk powder was hydrated for 30 minutes at 50° C. Stabilisers were dry mixed with ⅛ of the total sugar amount and dissolved in deionised water at 80° C. Thereafter, the stabiliser solutions were cooled to 40° C. and added to recombined milk under stirring for 5 minutes. The stabiliser-milk blends were pasteurised in tank at 95° C. for 10 minutes, cooled to fermentation temperature of 42° C. and inoculated with 0.02% yoghurt culture Jo-mix NM 1-20. The stabiliser-milk blends were fermented to pH 4.2 at 42° C., then they were agitated to brake down the casein curd and cooled to 10° C.

The remaining sugar part was added to the drinking yoghurts. pH was adjusted to 4.0 by addition of citric acid solution. At this stage the samples were divided into two parts: Homogenisation without post-pasteurisation and homogenisation combined with post-pasteurisation. Homogenisation was carried out at 300 bar. Samples to be pasteurised were preheated to 60° C. and homogenised at 300 bar/60° C. and subsequently pasteurised at 90° C. for 15 seconds. All drinks were filled in bottles and stored under cold conditions.

Evaluation of samples: All samples were inspected visually 1 day after production having been stored at 5° C. In addition, all samples were inspected visually and analytically 5 days after production having been stored at 5° C. Viscosity was measured at 10° C. with a Brookfield Viscometer model DVII equipped with spindle no. 61 and running at 30 rpm. The reading was taken after 30 seconds. Sedimentation was accelerated by centrifugation at 2800 g for 20 min. in a Heraeus Varifuge 3.2 S and expressed as the ratio of sediment to total sample. The particle size was measured in a phosphate-citrate buffer at pH 4.0 on a Malvern Mastersizer S.

Results—1 Day Post-Production

Non-Pasteurised Samples (without Final Pasteurisation to Prolong Shelf Life)

| Sample | Visual inspection |
|---|---|
| DPP2, 0.5% | Fine. No separation and no sedimentation. |
| Wave 212, 0.5% | Weak separation and sedimentation. |
| AMD 780, 0.4% | Separation and sedimentation. |
| SSPS, 0.4% | Fine. No separation and no sedimentation. |
| SSPS, 0.5% | Fine. No separation and no sedimentation. |
| No stabiliser | Separation and sedimentation. |

Post-Pasteurised Samples (Final Pasteurisation to Prolong Shelf Life)

| Sample | Visual inspection |
|---|---|
| DPP2, 0.5% | Fine. No separation and no sedimentation. |
| Wave 212, 0.5% | Weak separation and sedimentation. |
| AMD 780, 0.4% | Separation and sedimentation. |
| SSPS, 0.4% | Fine. No separation and no sedimentation. |
| SSPS, 0.5% | Fine. No separation and no sedimentation. |
| No stabiliser | Separation and sedimentation. |

Results—5 Days Post-Production
Non-Pasteurised Samples (without Final Pasteurisation to Prolong Shelf Life)

| Sample | pH | Visual inspection | Accelerated sedimentation | Viscosity | Mean particle diameter |
|---|---|---|---|---|---|
| DPP2, 0.5% | 4.0 | Weak separation and sedimentation | 13% | 6 cP | 2.7 μm |
| Wave 212, 0.5% | n.a. | Heavy separation and sedimentation | n.a. | n.a. | n.a. |
| AMD 780, 0.4% | n.a. | Heavy separation and sedimentation | n.a. | n.a. | n.a. |
| SSPS, 0.4% | 4.1 | Weak separation and sedimentation | 10% | 3 cP | 2.3 μm |
| SSPS, 0.5% | 4.1 | Weak separation and sedimentation | 13% | 6 cP | 2.6 μm |
| No stabiliser | 4.0 | Heavy separation and sedimentation | 18% | 6 cP | 6.0 μm |

Post-Pasteurised Samples (Final Pasteurisation to Prolong Shelf Life)

| Sample | pH | Visual inspection | Accelerated sedimentation | Viscosity | Mean particle diameter |
|---|---|---|---|---|---|
| DPP2, 0.5% | 4.0 | Weak separation and sedimentation | 10% | 6 cP | 2.4 μm |
| Wave 212, 0.5% | n.a. | Heavy separation and sedimentation | n.a. | n.a. | n.a. |
| AMD 780, 0.4% | n.a. | Heavy separation and sedimentation | n.a. | n.a. | n.a. |
| SSPS, 0.4% | 4.0 | Weak separation and sedimentation | 10% | 2 cP | 2.2 μm |
| SSPS, 0.5% | 4.1 | Weak separation and sedimentation | 10% | 5 cP | 2.0 μm |
| No stabiliser | 4.0 | Heavy separation and sedimentation | 20% | 7 cP | 8.8 μm |

The samples containing Wave 212 and AMD 780 were separated totally with rather compact sedimentation. As it was impossible to re-disperse this sediment upon heavy shaking, it was not possible to characterise the drinks with these stabilisers analytically.

AMD 780 was included in the application trial to illustrate what generally happens when commercial pectin stabilisers are added to the application prior to fermentation. The pasteurised milk-pectin blend destabilised almost immediately and did not re-stabilise under the following processing of fermentation, homogenisation and pasteurisation.

Wave 212 is a HE pectin fibre product with characteristics similar to DPP2 despite the fact that it has a higher viscosity of around 242 cP in a 5% solution at 25° C. AMD 780 typically has viscosity of more than 1000 cP. From other test series (not reported here) it is known that Wave 212 can stabilise the above drinking yoghurt recipe, when it is applied at 0.5% to the fermented yoghurt. However, the present trial indicates that the viscosity is too high for Wave 212 to be added to milk prior to fermentation without subsequent destabilisation of the milk-pectin blend.

SSPS is claimed to stabilise drinking yoghurt even when added to milk prior to pasteurisation, inoculation and fermentation. However, SSPS is mainly targeted at lower MSNF-contents and pH values than the applied conditions in this trial. Therefore, the characteristics of the drinking yoghurt in the present test are not quite optimal with SSPS—sediment values of around 2-3% would be expected with the present recipe and process when stabilised with AMD 780 at normal conditions (i.e. added after fermentation to the yoghurt).

DPP2 demonstrates that a stabiliser comprising a depolymerised pectin can be added to milk prior to pasteurisation, inoculation, and fermentation of the milk with a stabilising performance comparable to SSPS. The milk-stabiliser blend did not separate upon pasteurisation, inoculation, and fermentation and a fairly stable product was obtained upon homogenisation and even pasteurisation of the final drinking yoghurt. Like for SSPS, the stability of the resulting drinking yoghurt samples may not be fully optimal. Adjustment of recipe conditions (e.g. lower MSNF-content, lower pH) may improve the performance of DPP2.

The data illustrates that there is no detrimental effects of the second pasturisation step—and hence the invention is suitable for application in long-life products (typically of 6 month shelf life), and to food products containing live microorganisms (typically 14 to 28 days shelf life).

Example 2

Objective: To test the performance of 1) DPP4 with a viscosity close to 400 cP, and 2) the combination of DPP4 and high molecular weight pectin in a drinking yoghurt application where the pectin stabiliser is added to milk prior to pasteurisation, inoculation and fermentation for production of long life drinking yoghurt (post pasteurised drinking yoghurt).

DPP4 was made from GRINDSTED® Pectin AMD 1387 by the same procedure as DPP2, but only heat-treated for 2 hours to increase the viscosity at 5% solution to approx. 400 cP.

The characteristics of the depolymerised pectin sample tested were as follows:

|  | DPP4 |
|---|---|
| Degree of esterification | 70.4% |
| Viscosity, 5% solution at 25° C. | 387 cP |

The depolymerised pectin sample listed above (DPP4) was applied at dosages of 0.30% and 0.40%. In addition, a blend of 0.30% DPP4 and 0.10% AMD 780 (see below) was applied in the trial.

The following known stabilisers were used as comparative examples: GRINDSTED® Pectin AMD 780 (AMD 780) available from Danisco A/S was applied at 0.40%. Soyafibe-S-DA 100 (SSPS, soluble soybean polysaccharide, produced by Fuji Oil Co., Ltd., Japan) applied at 0.40%.

Drinking yoghurt model: The final drinking yoghurt was characterised by a milk solid non-fat content (MSNF) of 8%, a sugar content of 8%, a fat content of 0.1%, and a pH of 4.0. The milk base was fermented with Jo-Mix NM 1-20.

Recipe and process conditions: (based on a total volume of 4000 g per sample of drinking yoghurt) 337 g skimmed milk powder was hydrated for 30 minutes at 50° C. in about 2830 g of water (ranging from 2826-2842 depending on the stabiliser dosage). The stabilisers were dry mixed with ⅛ of the total sugar amount and dissolved in 500 g of deionised water at 80° C. Thereafter, the stabiliser solutions were cooled to 40° C. and added to the recombined milk under stirring for 5 minutes. The stabiliser-milk blends were pasteurised in a tank at 95° C. for 10 minutes, cooled to a fermentation temperature of 42° C. and inoculated with 0.02% Jo-Mix NM 1-20. The stabiliser-milk blends were fermented to pH 4.2 at 42° C. The blends were then agitated to break the casein curd and cooled to 10° C. to prevent post fermentation.

The remaining sugar part (320 g in total) was added to the drinking yoghurts. PH was adjusted to 4.0 by the addition of citric acid solution. The samples were homogenised at 300 bar/60° C. and subsequent pasteurised at 90° C. for 15 seconds. All drinks were cooled to 10° C., filled in bottles and stored at cold conditions.

Evaluation of samples: All samples were inspected visually and analytically seven days after production (stored at 5° C.). Viscosity of the final drinks was measured at 10° C. with a Brookfield Viscometer model DV-II equipped with spindle no. 61 and running at 30 rpm. The reading was taken after 30 seconds. Sedimentation was accelerated by centrifugation at 2800 g for 20 min. at room temperature in a Heraeus Varifuge 3.2 S and expressed as the weight ratio of sediment to total sample.

Results—7 Days Post Production

| Sample | pH | Visual inspection | Accelerated sedimentation | Viscosity |
|---|---|---|---|---|
| 0.30% DPP4 | 4.0 | Heavy separation and sedimentation | 18% | 7 cP |
| 0.40% DPP4 | 4.0 | Weak separation and sedimentation | 10% | 5 cP |
| 0.30% DPP4 + 0.10% AMD 780 | 4.0 | Weak separation and sedimentation | 7% | 5 cP |
| 0.40% SSPS | 4.0 | Weak separation and sedimentation | 7% | 4 cP |

-continued

| Sample | pH | Visual inspection | Accelerated sedimentation | Viscosity |
|---|---|---|---|---|
| Blind sample, i.e. no stabiliser added | 4.0 | Heavy separation and sedimentation | 21% | 10 cP |

Compared to Example 1 above, this experiment applied a depolymerised pectin sample having a higher viscosity, i.e. close to 400 cP (i.e. a higher molecular weight than in the first trial). DPP4 sample was applied at lower dosages than in Example 1. A significant improvement of stability compared to the blind sample was obtained with a dosage of 0.40% DPP.

The stability was improved further by blending DPP4 and AMD 780. A blend of 0.30% DPP4 and 0.10% AMD 780 performed equally as well as 0.40% SSPS under these conditions.

DPP4, which has a viscosity slightly lower than 400 cP, improved the stability of a post pasteurised drinking yoghurt when added at 0.40% to milk prior to pasteurisation, inoculation, fermentation and post pasteurisation. The stability was improved further with a blend of 0.30% DPP4 and 0.10% AMD 780, where the stability equalled that obtained with 0.40% SSPS.

Example 3

Objective: To test the performance of depolymerised pectin with different degrees of esterification in a stirred yoghurt application where the pectin stabiliser is dry-blended with milk powder, dispersed and hydrated prior to pasteurisation, inoculation and fermentation for production of stirred yoghurt. The experiment also investigates whether it is possible to achieve increased viscosity and enhanced creaminess compared to that obtainable with a standard, high molecular weight product such as GRINDSTED® Pectin SY 200 dosed at its maximal acceptable level of 0.15% added to milk prior to fermentation.

225 g GRINDSTED® Pectin LC 1700 was dissolved in 4 L hot demineralised water and the temperature adjusted to 80° C. Then 1.2 g aqueous hydrogen peroxide solution (35%) was then added. After stirring for 4 hours at 80° C. the mixture was cooled to room temperature and precipitated by mixing into 8 L 80 weight % aqueous isopropyl alcohol. After slowly mixing for an hour the precipitate was collected by filtration through a cloth and the material further washed by suspension in 4 L 60 weight % aqueous isopropyl alcohol for one hour. After separation of the liquid phase by filtration through a cloth the precipitated material was pressed by hand and dried in a ventilated oven at 60° C. overnight. 203 g dried DPP5 was milled to pass a 0.25 mm screen.

DPP7 was made from GRINDSTED® Pectin AMD 1387 by repetition of the procedure for preparation of DPP2 in Example 1.

The characteristics of the depolymerised pectin samples tested and the applied dosages were as follows:

|  | DPP 5 | DPP 6* | DPP 7 | GRINDSTED® Pectin SY 200 |
|---|---|---|---|---|
| Degree of esterification | 49.7% | 56.7% | 72.3% | 49% |

|  | DPP 5 | DPP 6* | DPP 7 | GRINDSTED ® Pectin SY 200 |
|---|---|---|---|---|
| Viscosity, 5% solution at 25° C. | 38.6 cP | 38.9 cP | 38.6 cP | Higher than 1000 cP |
| Applied dosages | 0.10% | 0.10% | 0.10% | 0.15% |
|  | 0.20% | 0.20% | 0.20% |  |
|  | 0.30% | 0.30% | 0.30% |  |
|  | 0.40% | 0.40% | 0.40% |  |
|  |  |  | 0.50% |  |

*DPP6 is a blend of 64% DPP5 and 36% DPP7, i.e. a blend of LE-DPP and HE-DPP pectins.

The commercial, standard pectin GRINDSTED® Pectin SY 200 (high molecular weight pectin) was used as a control for comparative purposes. This was applied as a reference at 0.15% corresponding to the maximal acceptable level before yoghurt becomes unacceptably grainy at the given processing conditions.

Stirred yoghurt model: The stirred yoghurt contained 2%-fat issued from reconstituted skimmed milk powder and whole milk powder adjusted to 4.0% protein that corresponded to 10.5% MSNF. Fermentation was performed with YO-MIX™ 301 culture to a final pH target of 4.5.

Recipe and process conditions (based on a total volume of 4000 g per sample of stirred yoghurt): Pectin was dry-blended with 225 g skimmed milk powder and 294 g whole milk powder and added to 3468 g water at 45° C. under good stirring. The mix was homogenised at 65° C./200, preheated to 80° C. and pasteurised at 95° C. for 6 minutes. The mix was inoculated with 0.02% YO-MIX™ 301 and fermented at 42° C. to pH 4.5. Finally, the yoghurt sample was cooled to 24° C., filled and stored at 5° C.

Evaluation of samples: All samples were analysed for the following criteria 3 days upon production:
- pH was measured with a pH meter METTLER DELTA 340.
- Brookfield viscosity was measured on a Brookfield DV II+Viscometer running at rpm equipped with spindle S25. A sample volume of 15 ml at 5° C. was used for the measurement. The reading was taken after 30 seconds.
- Visual syneresis on a scale from 1 (no whey at surface) to 9 (pronounced whey at surface).
- Visual smoothness on a scale from 1 (high graininess) to 9 (high smoothness).
- Thickness judged as the resistance of the sample to disintegrate in the mouth on a scale from 1 (very thin) to 9 (very thick).
- Sandiness judged as remaining, perceived particles in the mouth upon swallowing on a scale from 1 (smooth/no particles) to 9 (very sandy).
- Creaminess in mouth judged as yes (creamy perception) or no (watery).

Results—3 Days Post Production

| Sample | Dosage % | pH | Brookfield viscosity, cP | Visual syneresis | Smoothness | Thickness | Sandiness | Creaminess |
|---|---|---|---|---|---|---|---|---|
| DPP 5 | 0.10% | 4.4 | 2000 | 2 | 8 | 5 | 3 | No |
| DPP 6 | 0.10% | 4.4 | 2950 | 2 | 8 | 6 | 3 | Yes |
| DPP 7 | 0.10% | 4.4 | 2750 | 2 | 8 | 6 | 3 | Yes |
| DPP 5 | 0.20% | 4.3 | 3350 | 2 | 8 | 7 | 3 | Yes |
| DPP 6 | 0.20% | 4.4 | 2650 | 3 | 8 | 7 | 3 | Yes |
| DPP 7 | 0.20% | 4.4 | 2700 | 3 | 8 | 7 | 3 | Yes |
| DPP 5 | 0.30% | 4.5 | 2950 | 2 | 7 | 7 | 3 | No |
| DPP 6 | 0.30% | 4.5 | 3350 | 2 | 7 | 8 | 3 | Yes |
| DPP 7 | 0.30% | 4.5 | 3350 | 2 | 7 | 8 | 3 | Yes |
| DPP 5 | 0.40% | 4.5 | 3300 | 2 | 7 | 8 | 3 | Yes |
| DPP 6 | 0.40% | 4.4 | 3800 | 2 | 7 | 8 | 3 | Yes |
| DPP 7 | 0.40% | 4.4 | 3500 | 2 | 7 | 8 | 3 | Yes |
| DPP 7 | 0.50% | 4.5 | 3400 | 2 | 7 | 8 | 3 | No |
| SY 200 | 0.15% | 4.4 | 2800 | 3 | 7 | 5 | 3 | No |

Viscosity: Except DPP5 dosed at 0.10%, all the depolymerised pectin samples dosed at 0.10-0.20% yielded viscosities close to, equal to or even slightly higher than 0.15% SY 200. Increasing the dosage of depolymerised pectin to 0.30% and above led to a clear improvement in the viscosity compared to 0.15% SY 200.

Visual syneresis: All samples showed limited syneresis equivalent to the reference sample of 0.15% SY 200.

Smoothness: All samples were ranked high in smoothness with very small differences.

Thickness: All samples were perceived as either equivalent or thicker than the reference sample with 0.15% SY 200. As for the analytically measured viscosity dosages of 0.30% and above, the depolymerised pectin samples tested clearly improved thickness compared to 0.15% SY 200.

Sandiness: All samples were ranked equally in sandiness.

Creaminess: The reference sample with 0.15% SY 200 was not found creamy, whereas the depolymerised pectins tested made the stirred yoghurt creamy.

With the depolymerised pectin samples applied in this trial (DPP5, DPP6 and DPP7) it was possible to produce stirred yoghurt with viscosities equivalent to or pronouncedly higher than obtained with the reference pectin GRINDSTED® Pectin SY 200 dosed at its maximal acceptable level of 0.15%. Increased viscosity, enhanced sensory thickness and creamy perception were achieved with the depolymerised pectins dosed at 0.30% and above. Contrary to traditional, commercial high molecular weight pectin types like GRINDSTED® Pectin SY 200, such high dosages of depolymerised pectin could be dry-blended, dispersed and hydrated with milk powder prior to pasteurisation, inoculation and fermentation for production of stirred yoghurt. This was possible without creation of grittiness that usually happens with standard pectin products like GRINDSTED® Pectin SY 200 dosed at 0.15-0.20%.

Example 4

Objective: To test the performance of amidated LE depolymerised pectin, HE depolymerised pectin, and a combination thereof, in stirred yoghurt when applied to milk prior to pasteurisation and fermentation.

230 g GRINDSTED® Pectin LA1490 was dissolved in 4 L hot demineralised water by stirring and the temperature of the mixture adjusted to 80° C. To the stirred mixture was added 1.20 g aqueous hydrogen peroxide (35%) and the stirring continued at 80° C. for 4 hours. After cooling to room temperature, the depolymerised pectin was precipitated by mixing into 8 L 80 weight % aqueous isopropyl alcohol. After slowly mixing the precipitate for an hour the precipitate was collected by filtration through a cloth and the material further washed by suspension in 4 L 60 weight % aqueous isopropyl alcohol for one hour. After separation of the liquid phase by filtration through a cloth the precipitated material was pressed by hand and dried in a ventilated oven at 60° C. overnight. 217 g DPP9 was isolated and milled to pass a 0.25 mm screen.

DPP10 was prepared from GRINDSTED® Pectin AMD 1387 according to Example 1.

The composition DPP 8 used in this example was as follows:

| DPP9 | 32 g |
|---|---|
| DPP10 | 18 g |
| Total | 50 g |

The composition of the blend DPP8 was 64% depolymerised amidated low ester pectin and 36% depolymerised high-ester pectin.

The characteristics of the depolymerised pectin samples tested were as follows:

| Pectin | DPP8 | DPP9 | DPP10 |
|---|---|---|---|
| Degree of amidation | 15.4% | 23.1% | — |
| Degree of esterification | 41.6% | 27.7% | 69.5% |
| Viscosity, 5% solution at 25° C. | 33.7 cP | 35.4 cP | 33.6 cP |
| Applied dosage | 0.3% | not used | 0.3% |
|  | 0.4% | as single | 0.4% |
|  | 0.5% | pectin | 0.5% |

As a reference was used GRINDSTED® pectin SY 640 at a dosage of 0.1%. GRINDSTED® pectin SY 640 is an amidated low ester pectin Procedure: The procedure for the preparation of yoghurt is identical to Example 3 except that cream was added to the recipe to adjust the fat to 2%. The powder ingredients were mixed and the dry blend was added to the cream and water under agitation at 45° C., and subsequently preheated to 65° C., homogenised at 65° C./200 bar and pasteurised 95° C. for 6 minutes. After pasteurisation the mixture was cooled to 5° C. prior to the addition of a starter culture Yo-Mix 410 (added as a 10% solution in skimmed milk 0.02 units/l). After innoculation of the starter culture, the milk preparation was fermented at a temperature of 42° C.

The fermentation was allowed to proceed to pH 4.50. The typical fermentation time with the specific selected culture was found to be about 5 hours. The ferment was cooled on plate heat exchanger to 24° C. and placed in 5×155 ml beaker of each and stored at 5° C.

The yoghurts produced were analysed for:
Syneresis, measured after 3 weeks;
Polyvisc viscosity: Polyvisc® equipment, measurement of distance covered after 15 s by the release of a 100 ml volume of yoghurt at 5° C.; a high Polyvisc index corresponds to a fluid, non viscous product;
Brookfield viscosity (standard)

The characteristics of the depolymerised pectin samples tested were as follows:
Composition of Yoghurt Trials:

|  | Pectin type | | | |
|---|---|---|---|---|
|  | none | SY 640 | DPP8 | DPP 10 |
| pectin dosing levels | 0.0%; | 0.1%; | 0.3%; | 0.3%; |
|  | 0.0%; | 0.1%; | 0.4%; | 0.4%; |
|  | 0.0% | 0.1% | 0.5% | 0.5% |
| TOTAL FAT | 2.000% | 2.000% | 2.000% | 2.000% |
| TOTAL MSNF | 11.000% | 9.800% | 9.800% | 9.800% |
| TOTAL DRY MATTER | 18.000% | 16.900% | 17.100-17.300% | 17.100-17.300% |
| TOTAL SUGAR | 10.849% | 10.211% | 10.211% | 10.211% |
| TOTAL PROTEIN | 4.172% | 3.718% | 3.718% | 3.718% |

Evaluation of Yoghurt Trials:

| Sample | Dosage % | Brookfield 3 days* ± 350 [cP] | Brookfield 3 weeks ± 350 [cP] | Polyvisc [mm/sec] | Syneresis [index after 60 min] |
|---|---|---|---|---|---|
| Reference 11% MSNF | none | 4800 | 6300 | 38 | 100 |
| Reference 11% MSNF | none | 4200 | 4400 | 59 | 100 |
| Reference 11% MSNF | none | 4200 | 3900 | 67 | 100 |
| SY640 | 0.1 | 4950 | — | 59 | 99 |
| SY640 | 0.1 | 5750 | — | 45 | 93 |
| SY640 | 0.1 | 5600 | 5300 | 50 | 80 |
| DPP 8 | 0.3 | 5150 | 7500 | 48 | 95 |
| DPP 8 | 0.4 | 5500 | 6600 | 55 | 96 |
| DPP 8 | 0.5 | 2200 | 2500 | 135 | 94 |
| DPP 10 | 0.3 | 5650 | 6100 | 57 | 85 |
| DPP 10 | 0.4 | 5950 | 6000 | 62 | 89 |
| DPP 10 | 0.5 | 6150 | 7500 | 43 | 67 |

The overall conclusion from this series of trials was that dosing levels of 0.3% to 0.5% of DPP10 HE depolymerised pectins give similar or even higher viscosity levels than a dosing of 0.1% of the reference SY 640 pectin or reference yoghurt without pectin with 11% MSNF+, as indicated by high Brookfield viscosities and low Polyvisc index levels. The same conclusion can be drawn for pectin DPP8 at dosing levels of 0.3% and 0.4%, but at dosing level of 0.5%, viscosity in yoghurt sample containing pectin DPP8 collapses.

At all dosing levels, syneresis was lower in yoghurts samples containing any of the 3 tested pectins than in the reference 11% MSNF yoghurt samples.

All publications mentioned in the above specification are herein incorporated by reference. Various modifications and variations of the described methods and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in chemistry, biochemistry or related fields are intended to be within the scope of the following claims.

REFERENCES

[1] U. Einhorn-Stoll et al., Nahrung/Food vol. 45, pp. 332-337, 2001. Thermodynamic compatibility of sodium caseinate with different pectins. Influence of the milieu conditions and pectin modifications.

[2] A. Maroziene et al., Food Hydrocolloids vol. 14, pp. 391-394, 2000. Interaction of pectin and casein micelles.

[3] Anonymous. Food Chemical Codex 4$^{th}$ edition, National Academy Press Washington D.C., pp. 283-286, 1996. Pectins.

[4] A. Syrbe et al., Int. Dairy Journal, vol. 8, pp. 179-193, 1998. Polymer science concepts in dairy systems—an overview of milk protein and food hydrocolloid interaction.

[5] S. H. Christensen, FIA Conference Proceedings, 9 pp., 1992. Protein-pectin interaction in sour milk beverages.

[6] V. B. Tolstoguzov in Functional properties of food macromolecules edited by J. R. Mitchell, Elsevier Applied Science Publishers, London, pp. 385-415, 1986. Functional Properties of Protein-Polysaccharide Mixtures.

[7] E. Dickinson, Trends in Food Science & Technology, vol. 9, pp. 347-354, 1998. Stability and rheological implications of electrostatic milk protein-polysaccharide interactions.

[8] E. Kratz et al., Deutsche Milchwirtschaft, vol. 32, pp. 995-996, 1992. Apfelpektine zur stabilisierung von Milchprodukten.

[9] V. B. Tolstoguzov, Nahrung, vol. 42, pp. 205-209, 1998. Physico-chemical modification of food proteins: Food emulsions.

[10] P. G. Dalev et al., Papers presented at the 3rd International Symposium of Separations for Biotechnology, University of Reading, pp. 147-151, 1994. Use of non-specific interactions of gelating and pectin for concentration and separation of proteins and formulation of new nutritive products.

[11] G. O. Phillips in Emulsifiers, stabilisers and thickeners for the food industry 1, pp. 19-37, 1986. Interactions of anionic food hydrocolloids.

[12] V. Tolstoguzov in Macromolecular interactions in food technology by N. Parris et al., ACS Symposium series, pp. 2-14, 1996. Structure-property relationships in foods.

[13] L. Macfadyen, Int. Food Ing., vol. ½, pp. 11-14, 1992. New uses of pectin in the dairy industry.

[14] G. Tilly, Food Ingredients Europe: Conference Proceedings, pp. 105-121, 1991. Stabilization of dairy products by hydrocolloids.

[15] J. M. M. Cruijsen et al., Netherlands Milk & Dairy Journal, vol. 48, pp. 177-180, 1994. Effect of malto-dextrins on the heat stability of caseinate emulsions.

[16] J.-L. Doublier et al., Current Opinion in Colloid & Interface Science, vol. 5, pp. 202-214, 2000. Protein-polysaccharide interactions.

[17] R. Tuinier et al., Food Hydrocolloids, vol. 14, pp. 1-7, 2000. The effect of depolymerised guar gum on the stability of skim milk.

[18] S. Bourriot et al., International Dairy Journal, vol. 9, pp. 353-357, 1999. Phase separation, rheology and structure of micellar casein-galactomannan mixtures.

[19] H. Maeda, Handbooks of Hydrocolloids edited by G. O. Phillips and P. A. Williams, Woodhead Publishing LTD. ch. 17, pp. 309-320, 2000. Soluble soybean polysaccharide.

[20] S. A. El-Nawawi et al., Carbohydrate Polymers, vol. 27, pp. 191-195, 1995. Production of a low ester pectin by de-esterification of high ester citrus pectin.

[21] A. Rajni et al., Journal of Food Technology, vol. 14, pp. 333-342, 1979. Low methoxyl pectins from lime peel.

[22] R. R. Wiles et al., U.S. Pat. No. 3,622,559, Nov. 23, 1971. Method for producing pectins having high resistance to breakage and high capability for gelling in the presence of calcium.

[23] C. Kratchanov et al., International Journal of Food Science and Technology, vol. 24, pp. 261-267, 1989. Reaction of apple pectin with ammonia.

[24] M. Bordenave, In Plant Cell Wall Analysis (H. F. Linskens et al.), 165-180, 1996. Analysis of Pectin Methyl Esterases.

[25] R. J. McColloch et al., Archive of Biochemistry, vol. 13, pp. 217-229, 1948. Pectic Enzymes. VIII. Comparison of Fungal Pectin-Methylesterase with that of Higher Plants, Especially Tomatoes.

[26] TAMINE & ROBINSON: Yoghurt science and technology, p 255-256 and 261-267, Pergamon Press 1985

[27] U.S. Pat. No. 4,289,789: Instant drink yoghurt composition, Sep. 15, 1981

The invention claimed is:

1. A process for the production of a fermented dairy product comprising the steps of:
   (i) contacting a food material with a stabiliser to provide a food intermediate;
   (i)(a) pasteurising the food intermediate;
   (i)(b) inoculating the food intermediate; and
   (ii) fermenting the food intermediate;
   wherein the stabiliser is present in an amount of 0.3 to 3.0 wt %, and comprises a depolymerised pectin having a degree of esterification of at least 50% wherein the food material comprises milk.

2. A process according to claim 1 further comprising the step of (iii) pasteurising the product of step (ii).

3. A process according to claim 1 further comprising the step of (iv) adding juice and/or acid to the product of step (i)(b) and/or to the product of step (ii) and/or to the product of step (iii).

4. A process according to claim 1 wherein the depolymerised pectin has a viscosity at 25° C. in a 5% solution of 15 cP to 400 cP.

5. A process according to claim 1 wherein the depolymerised pectin has a viscosity at 25° C. in a 5% solution of 20 cP to 200 cP.

6. A process according to claim 1 wherein the depolymerised pectin has a viscosity at 25° C. in a 5% solution of 25 cP to 50 cP.

7. A process according to claim 1 wherein the depolymerised pectin is an essentially linear carbohydrate polymer.

8. A process according to claim 1 wherein the depolymerised pectin has a galacturonic acid content of at least 65%.

9. A process according to claim 1 wherein the depolymerised pectin has a degree of esterification of from 50 to 85%.

10. A process according to claim 1 wherein the depolymerised pectin has a degree of esterification of from 65 to 75%.

11. A process according to claim 1 wherein the food material further comprises a protein of vegetable and/or microbial origin.

12. A process according to claim 1 wherein the milk has a milk solid non-fat content of 0.1 to 25 wt %.

13. A process according to claim 1 wherein the milk is whole fat milk or partially defatted milk.

14. A process according to claim 1 wherein the fermentation step (ii) takes place at a temperature of from 30 to 50° C.

15. A process according to claim 1 wherein the fermentation step (ii) takes place over a period of 2 to 48 hours.

16. A process according to claim 2 wherein the pasteurising step (iii) takes place at a temperature of at least 80° C.

17. A process according to claim 2 wherein the pasteurising step (iii) takes place over a period of 5 to 30 seconds.

18. A process according to claim 1 wherein the fermented dairy product is a beverage.

19. A process according to claim 1 wherein the fermented dairy product is a fermented milk drink.

20. A process according to claim 1 wherein the fermented dairy product is a yoghurt drink.

21. A process according to claim 1 wherein the fermented dairy product is a drinking yoghurt drink.

22. A process according to claim 1 wherein the fermented dairy product is a stirred yoghurt.

23. A process according to claim 1 wherein the fermented dairy product contains a live food-grade micro-organism in an amount of from 0.01 to 0.03 wt %.

24. A process according to claim 1 wherein the fermented dairy product has a pH of less than 4.6.

25. A process according to claim 1 wherein the depolymerised pectin is amidated.

26. A process according to claim 1 wherein the stabiliser is a blend of a HE depolymerised pectin and a LE depolymerised pectin.

27. A process according to claim 1 wherein the stabiliser is a blend of a LE amidated depolymerised pectin and a HE depolymerised pectin.

28. A process according to claim 1 wherein the stabiliser is a HE depolymerised pectin and a high molecular weight pectin.

29. A process for improving the texture and/or viscosity of a fermented dairy product, comprising including a stabiliser in said fermented dairy product, wherein the stabiliser comprises a depolymerised pectin having a degree of esterification of at least 50%, and wherein said stabiliser is present in an amount of 0.3 to 3.0 wt %, and applied directly to the dairy product prior to fermentation.

30. The process according to claim 29 wherein the high molecular weight pectin is a high ester pectin.

\* \* \* \* \*